US008698831B2

(12) United States Patent
Kato et al.

(10) Patent No.: US 8,698,831 B2
(45) Date of Patent: Apr. 15, 2014

(54) IMAGE PROCESSING DEVICE AND IMAGE PROCESSING METHOD

(75) Inventors: Yutaka Kato, Fukuchiyama (JP); Yutaka Kiuchi, Ayabe (JP)

(73) Assignee: Omron Corporation, Kyoto-shi (JP)

( * ) Notice: Subject to any disclaimer, the term of this patent is extended or adjusted under 35 U.S.C. 154(b) by 990 days.

(21) Appl. No.: 12/561,958

(22) Filed: Sep. 17, 2009

(65) Prior Publication Data
US 2010/0073395 A1    Mar. 25, 2010

(30) Foreign Application Priority Data

Sep. 25, 2008 (JP) ............... P2008-246408

(51) Int. Cl.
*G09G 5/02* (2006.01)
*G06K 9/00* (2006.01)

(52) U.S. Cl.
USPC ............ 345/589; 345/590; 345/593; 382/142

(58) Field of Classification Search
USPC ............................. 382/141; 345/589, 590, 593
See application file for complete search history.

(56) References Cited

U.S. PATENT DOCUMENTS 7,292,711 B2 * 11/2007 Kiraly et al. .................. 382/103
7,359,573 B2 * 4/2008 Park et al. ..................... 382/274

FOREIGN PATENT DOCUMENTS

| JP | 2002-334326 A | 11/2002 |
| JP | 2004-357335   | 12/2004 |
| JP | 2005-236588   | 9/2005  |

OTHER PUBLICATIONS

Ulrich-Fuller, Laurie, and Robert C. Fuller. Photoshop CS3 Bible. Indianapolis, IN: Wiley Pub., Jul. 10, 2007. Print. Chapter 18 pp. 889-963.*

* cited by examiner

*Primary Examiner* — Kee M Tung
*Assistant Examiner* — Robert Craddock
(74) *Attorney, Agent, or Firm* — Foley & Lardner LLP

(57) ABSTRACT

This invention provides an image processing device and an image processing method capable of generating synthetic image data containing effective image information without being influenced by the variation of the photographing environment. A correcting portion updates (shifts) a "brightness" upper and lower limit range according to a deviation $\Delta E$ received from a deviation calculating portion. The correcting portion accepts an initial value $Emax0$ of the "brightness" upper limit and an initial value $Emin0$ of the lower limit in advance, so that the "brightness" upper limit and lower limit after update is $(Emax0+\Delta E)$ and $(Emin0+\Delta E)$, respectively. The "brightness" upper and lower limit range after the update calculated by the correcting portion is provided to a tone mapping unit.

17 Claims, 26 Drawing Sheets

FIG. 6
| EXPOSURE TIME (SECOND) | BRIGHTNESS RANGE |
|---|---|
| 1/10 | 10 − 30 |
| 1/20 | 20 − 40 |
| 1/40 | 30 − 50 |
| 1/80 | 40 − 60 |
| 1/160 | 50 − 70 |
| 1/320 | 60 − 80 |
| 1/640 | 70 − 90 |
| 1/1280 | 80 − 100 |
FIG. 7A
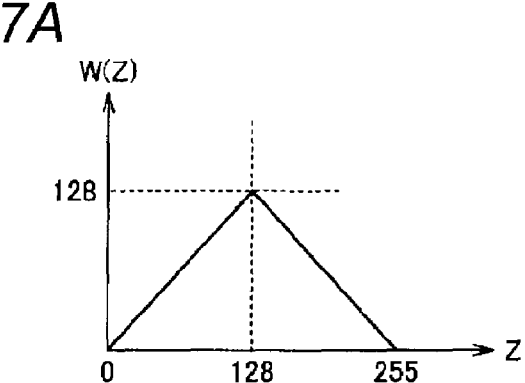
FIG. 7B
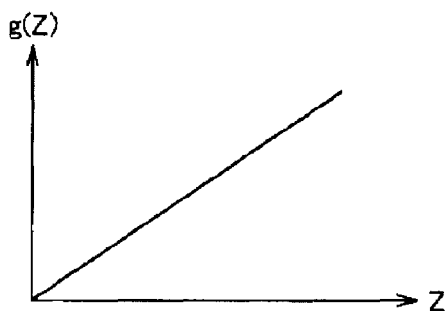

IMAGE PROCESSING DEVICE AND IMAGE PROCESSING METHOD

BACKGROUND OF THE INVENTION

This application is based on Japanese Patent Application No. 2008-246408 filed with the Japan Patent Office on Sep. 25, 2008, the entire content of which is hereby incorporated by reference.

1. Technical Field

The present invention relates to an image processing device and an image processing method for generating a synthetic image data with enlarged dynamic ranges by using a plurality of image data obtained by photographing a photographing range a plurality of times under different exposure conditions.

2. Related Art

In the field of FA (Factory Automation) and the like, a so-called visual sensor is being put to practical use as a device for optically testing defects and the like produced in the measuring article such as a workpiece and for optically measuring the size of the defects and the like.

When performing tests and measurements using such a visual sensor, the measuring article needs to be appropriately photographed. The dynamic range (tone range where light can be detected) of the imaging element such as a CCD (Coupled Charged Device) and CIS (Complementary Metal Oxide Semiconductor Image Sensor) is generally finite. Thus, when the exposure time at the time of photographing becomes long, whiteout (halation) is entirely or partially produced, and the luminance and the color information of the measuring article cannot be accurately acquired. When the exposure time at the time of photographing becomes short, total underexposure entirely or partially occurs, and an effective luminance cannot be acquired. Furthermore, in the measuring article having portions where the reflectivity locally differs and the measuring article having portions of large curvature, partial whiteout and total underexposure occur under the influence of lighting and the like.

Thus, if the difference between the minimum value and the maximum value of the light power (light energy that enters per unit time) radiated from the same measuring article exceeds the dynamic range of the imaging element, the entire measuring article cannot be appropriately photographed.

A technique of enlarging the dynamic range by photographing the same measuring article plurality of times under different exposure conditions, and synthesizing a plurality of image data obtained therefrom is known. Such a process is also referred to as a high dynamic synthesizing process or super latitude process (SL process). For instance, Japanese Laid-Open Patent Publication No. 2002-334326 discloses a visual sensor that realizes enlargement of the dynamic range with small calculation processing load.

The solar light is often taken in as part of the lighting in a factory with the increased consciousness in recent environmental problems such as reduction of carbon dioxide. For instance, a skylight may be disposed at the roof of the factory so that the solar light can be taken into the factory from the skylight.

Taking in the solar light should be recommended from the standpoint of saving energy, but may become a disturbance factor for the visual sensor. In other words, the brightness of the solar light greatly fluctuates depending on the time zone (day and night), season, and the like. When such solar light is emitted on the measuring article, the light power radiated from the visual sensor temporally changes.

Generally, appropriate photographing conditions, judgment conditions, and the like are tuned under a certain photographing environment with such a visual sensor, but the set values thereof will become inappropriate if the photographing environment changes from the time of tuning.

When the photographing environment changes, the synthetic image data including effective image information may not be generated from the measuring article.

SUMMARY

The present invention has been devised to solve the problems described above, and an object thereof is to provide an image processing device and an image processing method capable of generating synthetic image data including effective image information without being influenced by the variation of the photographing environment.

According to an aspect of the present invention, there is provided an image processing device connected to an imaging unit and a display unit. The imaging unit includes an imaging element partitioned into a plurality of pixels and having an exposure condition changeable. The image processing unit includes: an acquiring unit for acquiring a plurality of image data by causing the imaging unit to photograph a photographing range a plurality of times under different exposure conditions; a calculation unit for calculating a luminance distribution corresponding to a distribution of a light energy entering the imaging element based on the plurality of image data and the exposure condition corresponding to each of the image data; a conversion unit for converting the luminance distribution to a distribution of a tone value in a default numerical range to be displayed on the display unit; and an updating unit for updating a first range in the correspondence relationship based on the light energy entering the imaging element, the updating unit including a unit for accepting a second range that is a range where the update of the first range is allowed. The conversion unit performing the conversion by relating a luminance value within the first range to be corresponded to the tone value Preferably, the updating unit further includes a unit for accepting a second range that is a range where the update of the first range is allowed.

Preferably, the image processing device further includes: a displaying unit for causing the display unit to display the luminance distribution, wherein the updating unit simultaneously displays the set second range with the luminance distribution. Further, the updating unit preferably further includes a unit for accepting a region setting with respect to the image data imaged by the imaging unit, and a unit for shifting a position while maintaining a width of the first range based on the luminance of a pixel for which the region setting has been performed.

Further preferably, the updating unit further includes a unit for executing an error process when part of the first range is updated outside the second range.

Further preferably, the updating unit further includes a unit for displaying a temporal change history of the first range on the display unit.

Further preferably, the updating unit further includes a unit for setting the second range based on the temporal change history of the first range.

Preferably, the updating unit further includes a unit for accepting an initial value of the first range, a settable range of the initial value of the first range being limited to within the second range.

Preferably, the image processing device further includes a generation unit for generating synthetic image data based on color information contained in the plurality of image data and the tone value of the corresponding pixel.

Preferably, the calculation unit calculates the luminance value distribution corresponding to the distribution of the light energy entering the imaging element by calculating a luminance value that corresponds to the light energy entering the imaging element and is obtained based on the plurality of image data and the exposure condition corresponding to each of the image data, the luminance value having a constant or greater luminance resolution within an effective dynamic range. The first range is a range smaller than the effective dynamic range, and the updating unit updates the first range corresponded to the tone value in the conversion unit to a luminance value of the first range after the update that is a range included in the effective dynamic range in addition to being smaller than the effective dynamic range and that is different from the first range, according to variation in the light energy entering the imaging element.

Preferably, the image processing device further includes a display unit for displaying the default range tone value distribution. Further preferably, the image processing device further includes: a unit for accepting a region setting with respect to the image data imaged by the imaging unit, wherein the updating unit updates the first range to the first range after the update such that a tone value distribution in the region setting obtained through conversion by the conversion unit after the update is substantially the same as the tone value distribution before the update.

Further preferably, the updating unit performs update to the first range after the update having a width of a dynamic range equal to a width of the dynamic range of the first range.

Preferably, the updating unit includes a unit for accepting the second range. Further preferably, the image processing device further includes a display unit for simultaneously displaying the luminance value of the second range with the luminance value of the effective dynamic range.

Preferably, the updating unit further includes a unit for executing an error process when part of the first range after the update is updated outside the effective dynamic range.

Preferably, the updating unit further includes a unit for accepting an initial value of the first range, and a settable range of the initial value of the first range is limited to within the effective dynamic range.

According to another aspect of the present invention, there is provided an image processing method in a device connected to an imaging unit and a display unit. The imaging unit includes an imaging element partitioned into a plurality of pixels. The method includes the steps of: accepting a first range on a luminance; accepting a second range including the first range; acquiring a plurality of image data by causing the imaging unit to photograph a photographing range plurality of times under different exposure conditions; calculating a luminance distribution corresponding to a distribution of a light energy entering the imaging element based on the plurality of image data; updating the first range based on the light energy entering the imaging element in a correspondence relationship of the luminance in the first range and an effective tone value; and converting the luminance distribution to a tone value to be displayed on the display unit according to the correspondence relationship after the update.

According to an aspect of the present invention, the synthetic image data including effective image information can be generated without being subjected to the influence of variation of the photographing environment.

BRIEF DESCRIPTION OF THE DRAWINGS

FIG. 6 is a diagram showing one example of a relationship of the exposure time set in the imaging unit and the "brightness" range suited for photographing;

FIGS. 7A and 7B are diagrams showing one example of characteristics of a weighting function and a response function;

DETAILED DESCRIPTION

Figure 1:
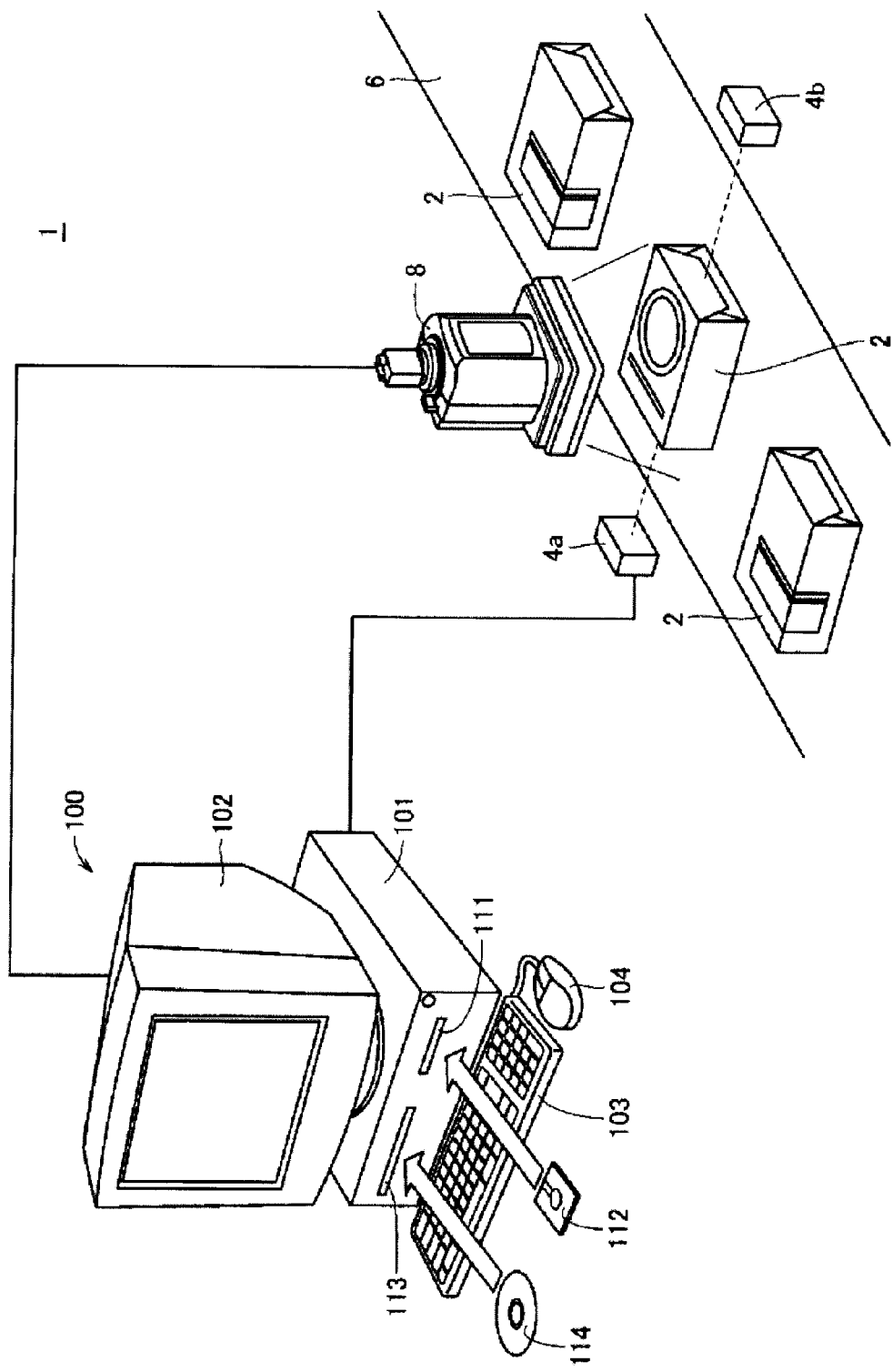
FIG. 1 is a schematic view showing an overall configuration of a visual sensor system including an image processing device according to an embodiment of the present invention.

Hereinafter, preferred embodiments of the present invention will be described with reference to the drawings. The same reference numerals will be given for the same or corresponding portions in the figures, and the description thereof will not be repeated.

<Configuration of Entire Device>

Figure 2:
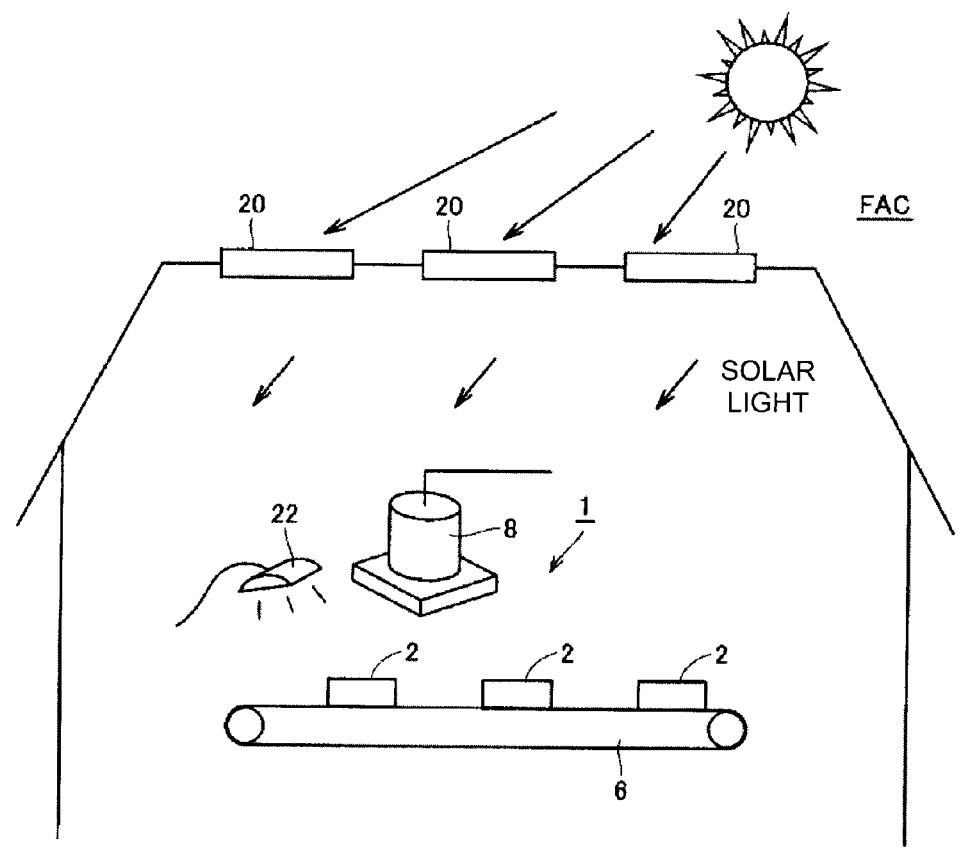
FIG. 2 is a schematic view showing one example of an arrangement state of the visual sensor system including the image processing device according to the embodiment of the present invention.

FIG. 1 is a schematic view showing an overall configuration of a visual sensor system 1 including an image processing device according to an embodiment of the present invention. FIG. 2 is a schematic view showing one example of an arrangement state of the visual sensor system 1 including the image processing device according to the embodiment of the present invention.

With reference to FIG. 1, the visual sensor system 1 is representatively incorporated in a production line and the like to test defects and the like optically in a measuring article (hereinafter also referred to as "workpiece") and to measure the size thereof optically. By way of example, in the embodiment of the present invention, a workpiece 2 is conveyed by a conveyance mechanism 6 such as a belt conveyor, and the conveyed workpiece 2 is sequentially photographed by an imaging unit 8. The image data (hereinafter also referred to as "input image data") obtained when the imaging unit 8 photographs the photographing range is transmitted to a computer 100, which is a representative example, embodying the image processing device according to the present embodiment. In the present embodiment, a process of handling color input image data will be mainly described.

When the workpiece 2 reaches the photographing range of the imaging unit 8, this is detected by photoelectric sensors disposed at both ends of the conveyance mechanism 6. Specifically, each photoelectric sensor includes a light receiving portion 4a and a light projecting portion 4b disposed on the same optical axis, where the light receiving portion 4a detects that the light radiated from the light projecting portion 4b is shielded by the workpiece 2 to thereby detect the arrival of the workpiece 2. The control itself of the conveyance mechanism 6 is controlled by a PLC (Programmable Logic Controller) and the like (not shown).

With reference to FIG. 2, the visual sensor system 1 according to the present embodiment is disposed in a factory building FAC. A skylight 20 is disposed at the roof of the factory building FAC. The solar light is taken into the factory including the workpiece 2 through the skylight 20. A dedicated lighting 22 for irradiating the workpiece 2 to be photographed with the imaging unit 8 with light is also disposed. An indoor lighting (not shown) such as a fluorescent lamp and a mercury lamp is also disposed in the factory building FAC.

Therefore, the imaging unit 8 captures light (reflected light) radiated by the workpiece 2 upon receiving the illumination light from the dedicated lighting 22 and the indoor lighting, as well as the solar light as an image.

Again referring to FIG. 1, the imaging unit 8 starts to photograph the workpiece 2 when arrival of the workpiece 2 is detected by the photoelectric sensors. Alternatively, photographing may be successively performed, and the tests and measurements of the workpiece 2, to be described later, may be started at a timing the arrival of the workpiece 2 is detected.

By way of example, the imaging unit 8 is configured to include an imaging element partitioned into a plurality of pixels such as CCD (Coupled Charged Device) and CIS (Complementary Metal Oxide Semiconductor Image Sensor) sensor in addition to an optical system such as a lens. The imaging element corresponding to each pixel has one or a plurality of spectral sensitivities with respect to the incident light.

More specifically, the imaging element of the imaging unit 8 has a spectral sensitivity for each of "red", "green", and "blue" based on three primary colors of light with respect to each pixel, by way of example. The imaging element of the imaging unit 8 outputs detection values (R luminance, G luminance, B luminance) of three colors of "red", "green", and "blue" for the incident light. The R luminance indicates the magnitude of the light energy (light intensity) corresponding to the wavelength component contained in the red spectral sensitivity of the light entering the imaging element. The G luminance and the B luminance each indicate the magnitude of the light energy corresponding to the wavelength component contained in the corresponding spectral sensitivity. In the present embodiment, the R luminance, the G luminance, and the B luminance are all assumed to be defined in the range of eight bits (0 to 255 tones).

The spectral sensitivity of the imaging element is not limited to three (three bands) and the imaging element may have spectral sensitivities to more colors. An imageable color gamut can be further enlarged by using the multiband imaging element. Alternatively, the detection values (C luminance, M luminance, Y luminance) of three colors of "cyan", "magenta", and "yellow", which are complementary colors of the three primary colors of light, may be provided as spectral sensitivities. When using a single CCD and the like, each pixel often has light reception sensitivity with respect to only one of "red", "green", and "blue". In such a case, the input image data having luminance for each of "red", "green", and "blue" may be generated by an interpolation unit (not shown).

In particular, the imaging unit 8 according to the present embodiment can change the exposure condition (typically, exposure time) at the time of photographing. The exposure condition is a value for adjusting the light energy that enters the imaging element in one imaging, and is typically adjusted by an aperture amount of the optical system, and the mechanical or electronic shutter speed. In the present embodiment, a configuration of adjusting the "exposure time" is illustrated as a representative example of the exposure condition, but not limited to the exposure time, the aperture amount and the like may be adjusted.

The computer 100 includes a computer body 101 mounting an FD (Flexible Disk) driving device 111 and a CD-ROM (Compact Disk Read Only Memory) driving device 113, a monitor 102, a keyboard 103, and a mouse 104. The computer body 101 executes a program stored in advance to implement the image processing device according to the present embodiment.

<Hardware Configuration>

Figure 3:
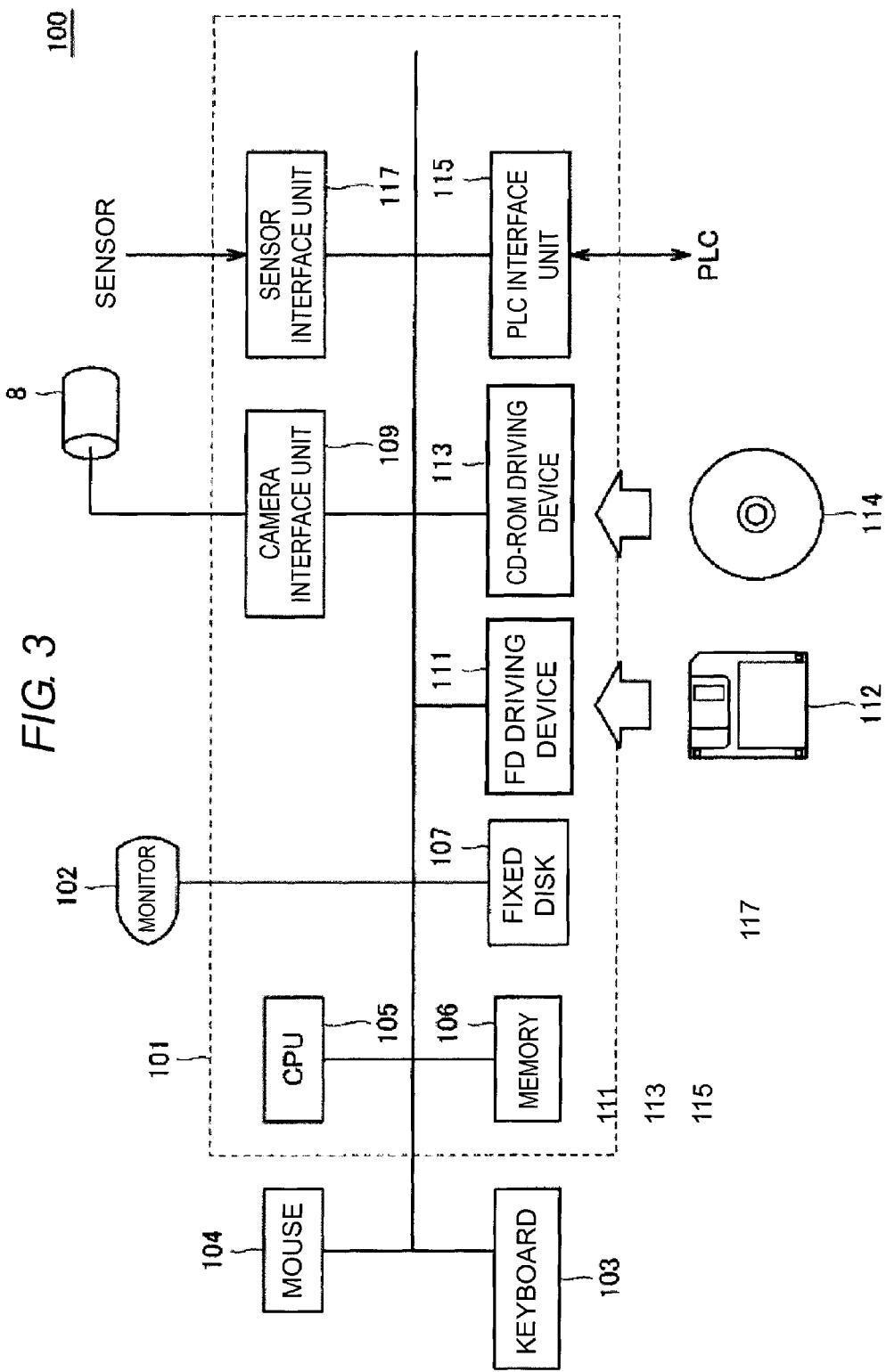
FIG. 3 is a schematic configuration view showing a hardware configuration of a computer according to an embodiment of the present invention.

FIG. 3 is a schematic configuration view showing a hardware configuration of the computer 100 according to an embodiment of the present invention.

With reference to FIG. 3, the computer body 101 includes, in addition to the FD driving device 111 and the CD-ROM driving device 113 shown in FIG. 1, a CPU (Central Processing Unit) 105, a memory 106, a fixed disk 107, a camera interface unit 109, a PLC interface unit 115, and a sensor interface unit 117, which are mutually connected with a bus.

An FD 112 is attachable to the FD driving device 111, and a CD-ROM 114 is attachable to the CD-ROM driving device 113. As described above, the image processing device according to the present embodiment is implemented when the CPU 105 executes a program using computer hardware such as the memory 106. Such a program is generally stored in a recording medium such as the FD 112 and the CD-ROM 114, or distributed through network and the like. Such a program is read from the recording medium by the FD driving device 111 or the CD-ROM driving device 113, and once stored in the fixed disk 107, which is a storage device. The program is then read from the fixed disk 107 to the memory 106 and executed by the CPU 105.

The CPU 105 is a calculation processing unit for performing various types of calculations by sequentially executing the programmed commands. The memory 106 temporarily stores various types of information according to the execution of the program in the CPU 105.

The camera interface unit 109 enables data communication between the computer body 101 and the imaging unit 8. More specifically, the camera interface unit 109 includes an image buffer and an exposure time setting portion. The image buffer once accumulates the input image data photographed and sequentially transmitted by the imaging unit 8, and transfers the accumulated data to the memory 106 or the fixed disk 107 when the input image data for one photographing is accumulated. The exposure time setting portion transmits a command to the imaging unit 8 before photographing according to an internal command from the CPU 105, and sets the exposure time in the imaging unit 8.

The PLC interface unit 115 is a device for enabling data communication between the computer body 101 and a PLC (not shown). The sensor interface unit 117 receives a detection signal from the photoelectric sensors and the like, and transmits the signal to the CPU 105.

The fixed disk 107 is a non-volatile storage medium for storing programs to be executed by the CPU 105, input image data, and the like.

The monitor 102 connected to the computer body 101 is a display unit for displaying the information outputted by the CPU 105, and is configured by an LCD (Liquid Crystal Display), a CRT (Cathode Ray Tube), and the like, by way of example. As described later, the monitor 102 according to the present embodiment displays a synthetic image generated by photographing the workpiece 2, a prospective processing time required for one synthesizing process, the histogram for "brightness" of the synthetic image data, and the like.

The mouse 104 accepts a command from the user corresponding to the operation of clicking, sliding, and the like. The keyboard 103 accepts a command from the user corresponding to the input key.

The computer 100 may also be connected with other output devices such as a printer, as necessary.

<Operation Mode>

The visual sensor system 1 according to the present embodiment can select an "operation mode" in which tests and measurements are actually executed using the synthetic image data generated by photographing the workpiece 2, and a "setting mode" in which the setting related to the synthesizing process for the workpiece 2 is performed.

In the "setting mode", the user sets an appropriate photographing condition while referencing the synthetic image based on the synthetic image data displayed on the monitor 102. In the "operation mode", the synthetic image data obtained by photographing the workpiece 2 actually flowing through the production line is generated, and tests and measurements are performed on the synthetic image data.

<Image Synthesizing Process>

The image synthesizing process for generating the synthetic image data will now be described. The image synthesizing process according to the present embodiment mainly aims to enlarge the dynamic range of the imaging unit 8.

Figure 4A:
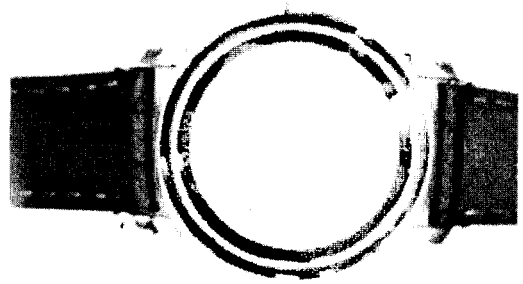
FIGS. 4A to 4C are diagrams showing input image data when the back surface of a watch is photographed as a workpiece.
Figure 4B:
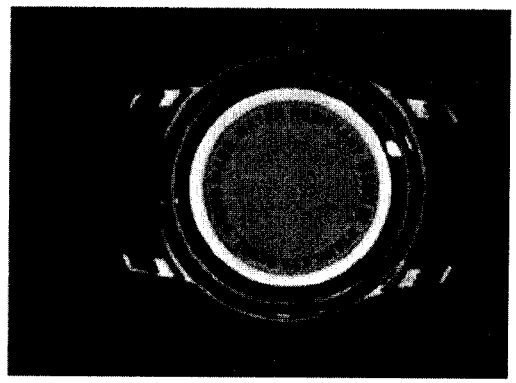
Figure 4C:
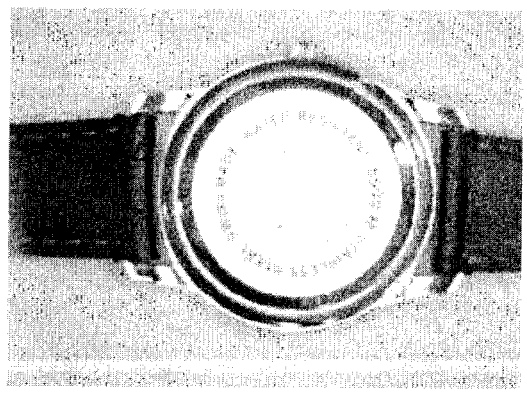

FIGS. 4A to 4C are diagrams showing the input image data when the back surface of a watch is photographed as a workpiece. FIG. 4A shows the photographed image obtained by photographing of one time under a condition of relatively long exposure time, and FIG. 4B shows the photographed image obtained by photographing of one time under a condition of relatively short exposure time. In FIGS. 4A and 4B, the intensity of the incident light is assumed to be under the same condition. The workpiece shown in FIG. 4 includes a clock main body made of metal and a band made of leather. As the reflectivity of the clock main body and the band greatly differs, a large difference is created in the light power (light energy radiated per unit time) radiated from each part.

Thus, when the exposure time is long, the clock main body having a relatively high reflectivity produces whiteout, and an effective luminance cannot be acquired. In other words, the characters marked on the clock main body cannot be identified, as shown in FIG. 4A. When the exposure time is short, the light energy cannot be sufficiently received from the band having a relatively low reflectivity, and an effective luminance cannot be acquired. In other words, as shown in FIG. 4B, the band produces total underexposure, and defects such as stitches cannot be identified.

The image processing device according to the present embodiment thus photographs the same workpiece 2 a plurality of times at different exposure conditions (exposure time), and generates the synthetic image data from a plurality of photographed input image data. The input image data includes a value (luminance distribution of each color) indicating the distribution of the light energy that enters the imaging unit 8, and the image processing device according to the present embodiment calculates the color information (hereinafter also referred to as "composite color information") and the luminance (hereinafter also referred to as "synthetic luminance") of each pixel of the synthetic image data based on the value (luminance of each color) indicating the light energy of the input image data corresponding to each pixel and the exposure condition (exposure time) at the time of photographing of the corresponding input image data. The synthetic image data is then generated based on the composite color information and the synthetic luminance.

In other words, the synthetic luminance is equivalent to the luminance value corresponding to the light energy that enters the imaging element of the imaging unit 8, and has a luminance resolution of greater than or equal to a predetermined value within the effective dynamic range as it is synthesized based on the input image data obtained by photographing a plurality of times under different exposure conditions. Furthermore, the luminance value distribution corresponding to the distribution of the light energy that enters the imaging element of the imaging unit 8 is calculated from the synthetic luminance. That is, the effective dynamic range means the range of the synthetic luminance from which a luminance resolution of greater than or equal to a predetermined value is obtained from the photographed input images obtained by photographing a plurality of times under different exposure conditions.

In summary, in the calculation process of the synthetic luminance, the value (luminance) indicating the light energy in each of the input image data is standardized with the exposure time for each pixel. That having a magnitude of the standardized luminance in an appropriate range is preferentially adopted. In other words, the synthetic luminance of each pixel in the synthetic image data calculated with the information of the pixel photographed at the exposure time suited to the light power (light energy that enters per unit time) radiated from the workpiece 2 of the information of the corresponding pixels of the plurality of input image data as the main component. Through such a process, the synthetic image data can be generated as a collection of pixels having the luminance photographed at an appropriate exposure time. FIG. 4C is a diagram showing one example of the synthetic image data generated by the image synthesizing process according to the present embodiment. As shown in FIG. 4C, the synthetic image data that does not include whiteout as in FIG. 4A and total underexposure as in FIG. 4B can be generated by performing the above-described image synthesizing process.

A non-linear tone mapping is effectively carried out to represent a wide dynamic range with one image having finite tones. The tone mapping includes various methods, logarithmic conversion, gamma correction, and the like being representative examples of the non-linear tone mapping calculated using the function. Alternatively, the tone mapping of any shape can be performed by using a lookup table defined in advance instead of the function. The timing of applying tone mapping includes two methods of processing after performing the addition process and processing before the addition process. That is, the tone mapping has numerous variations, and the processing timing has two methods.

In the present embodiment, the configuration for a case of performing the addition process after performing the logarithmic conversion is shown as an example of such processes.

The image synthesizing process according to the present embodiment is achieved mainly by the following five processes.

(1) Process of sequentially photographing the workpiece 2 at different exposure times (photographing process)
(2) Process of calculating the synthetic luminance from the luminance of the photographed input image data (luminance synthesizing process)
(3) Process of calculating a tone value from the calculated synthetic luminance (tone value conversion process)
(4) Process of calculating composite color information from the color information of the photographed input image (color synthesizing process)
(5) Process of generating the synthetic image data from the composite color information and the tone value (generation process).

In particular, the image processing device according to the present embodiment executes a "brightness" follow-up process. In the "brightness" follow-up process, the correspondence relationship used in the (3) tone value conversion process is sequentially updated (followed up) according to change in the photographing environment (in particular, lighting environment on the workpiece 2). The correspondence relationship defines the range to be effectively displayed as the synthetic image data of the calculated synthetic luminance. In other words, the image processing device according to the present embodiment photographs the workpiece 2 with the dynamic range including the variation range of the photographing environment, and assigns that in a specific range of the photographed synthetic luminance in the workpiece 2 to the tone value range to be expressed as an image. Specifically, the correspondence relationship corresponds the specific range and the effective tone value of the dynamic range of the synthetic luminance.

The image processing device according to the present embodiment dynamically changes the specific range of the synthetic luminance assigned to the effective tone value range based on the light energy that enters the imaging element. The synthetic image data including the effective image information thus can be generated without being influenced by the variation of the photographing environment.

After describing the outline of the processes (1) to (5), the characteristic process of the present embodiment will be described.

<Overall Control Structure>

Figure 5:
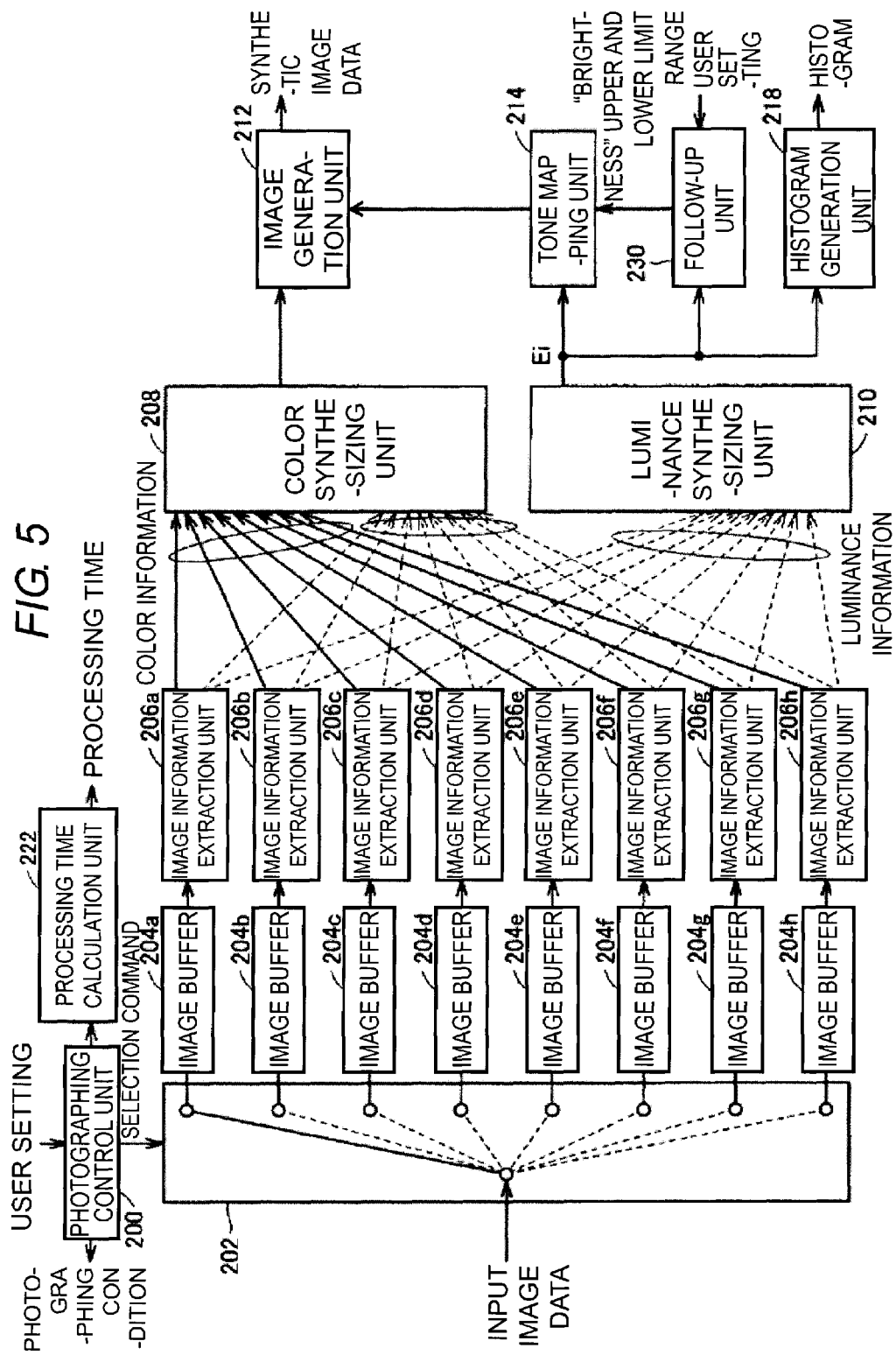
FIG. 5 is a function block diagram showing an overall control structure of the image processing device according to the embodiment of the present invention.

FIG. 5 is a function block diagram showing the overall control structure of the image processing device according to the embodiment of the present invention.

With reference to FIG. 5, the image processing device according to the present embodiment includes, a photographing control unit 200, a selection unit 202, image buffers 204a to 204h, and image information extraction units 206a to 206h as a control structure for implementing the (1) photographing process, a luminance synthesizing unit 210 and a histogram generation unit 218 as a control structure for implementing the (2) luminance synthesizing process, a tone mapping unit 214 and a follow-up unit 230 as a control structure for implementing the (3) tone value conversion process, a color synthesizing unit 208 as a control structure for implementing the (4) color synthesizing process, and an image generation unit 212 as a control structure for implementing the (5) generation process. The image processing device according to the present embodiment also includes a processing time calculation unit 222.

The content of each process in the image processing device according to the present embodiment will be described below with the operation of each function block.

(1) Photographing Process

With reference to the photographing process diagram FIG. 5, the photographing control unit 200 acquires a plurality of input image data by causing the imaging unit 8 to photograph the same workpiece 2 a plurality of times at different exposure times. The photographing control unit 200 determines how to change the exposure time according to the user setting. More specifically, the imaging unit 8 according to the present embodiment includes an electronic shutter, of which the shutter speed can be set to any speed, by way of example, so that the exposure time can be changed to any time. The exposure time that can be changed includes eight patterns, by way of example, of "$1/10$ seconds", "$1/20$ seconds", "$1/40$ seconds", "$1/80$ seconds", "$1/160$ seconds", "$1/320$ seconds", "$1/640$ seconds", and "$1/1280$ seconds" as a standard. The exposure time group that can be changed is set so as to be sequentially faster at the power of two with "$1/10$ seconds" as a reference (slowest value).

The photographing control unit 200 sequentially sets the exposure time of the imaging unit 8 before each photographing according to the number of photographing times defined in advance and the exposure time in each photographing, and sequentially photographs the workpiece 2 using the imaging unit 8 at each set exposure time. Furthermore, the photographing control unit 200 provides a selection command to the selection unit 202 in synchronization with each photographing, and sequentially stores the input image data generated when the imaging unit 8 sequentially photographs the workpiece 2 in the image buffers 204a to 204h.

The selection unit 202 is disposed between the imaging unit 8 and the image buffers 204a to 204h, and electrically connects one of the image buffers 204a to 204h with the imaging unit 8 in response to the selection command from the photographing control unit 200. According to such operation, the input image data generated when the imaging unit 8 photographs the workpiece 2 is sequentially stored in the image buffers 204a to 204h. In the following, the image buffers 204a to 204h are also collectively referred to as "image buffer 204".

The image buffer 204 is configured in correspondence to the exposure time of the imaging unit 8, and stores the input image data photographed at a corresponding specific exposure time. For instance, the image buffer 204a stores only the input image data photographed at a condition where the exposure time is "1/10 seconds", and the image buffer 204b stores only the input image data photographed at a condition where the exposure time is "1/20 seconds".

The image information extraction units 206a to 206h are respectively corresponded to the image buffers 204a to 204h, and extract the color information and the luminance from the input image data stored in the corresponding image buffer 204. Representatively, the input image data is configured from the luminances of three colors (R luminance, G luminance, B luminance), i.e., the value corresponding to the light energy that enters each pixel. The color information of the input image data represents the relative relationship (relative ratio) of each luminance after standardizing the luminances of three colors. The luminance of the input image data comprehensively represents the light energy that enters each pixel, and is equivalent to the average value (or sum) of the luminances of three colors.

The image information extraction units 206a to 206h then output the extracted color information to the color synthesizing unit 208 and output the extracted luminance to the color synthesizing unit 208 and the luminance synthesizing unit 210.

(2) Luminance Synthesizing Process

After a series of photographing (all photographing at preset exposure times) by the imaging unit 8 is completed, the luminance synthesizing unit 210 calculates the synthetic luminance of each pixel after standardizing the luminance of each of the input image data with the corresponding exposure time. As described above, the range of the light power suited for photographing fluctuates by changing the exposure time in the imaging unit 8. In other words, relatively short exposure time is suited for photographing of the range of greater light power and the relatively long exposure time is suited for photographing of the range of smaller light power.

In the present specification, an index "brightness" corresponding to the magnitude of the light energy radiated from the workpiece is used. The "brightness" is a relative value that depends on the performance of the imaging unit 8, where the actual light energy differs even when the "brightness" is the same if the sensitivity of the imaging element, the open value of the optical system, and the like are different.

Generally, the magnitude of the light energy that enters the imaging unit 8 (imaging element) is assumed to be proportional to the exposure time. Thus, the "brightness" in the present specification obtained by dividing the luminance detected by the imaging unit 8 with the exposure time and taking the logarithm of the value is representatively used. Therefore, the "brightness" in the present specification is an index indicating the magnitude of the light energy (light power) per unit exposure time. Through the use of such "brightness", the "brightness" range suited for photographing by the imaging unit 8 can be defined in advance in correspondence to each exposure time that can be set to the imaging unit 8.

More specifically, as the eight exposure times that can be set to the imaging unit 8 according to the present embodiment become sequentially shorter at the power of two, the correspondence relationship between each exposure time and the "brightness" can be defined as in FIG. 6.

FIG. 6 is a diagram showing one example of a relationship between the exposure time set in the imaging unit 8 and the "brightness" range suited for photographing.

With reference to FIG. 6, setting the "brightness" range suited for photographing for a case in which the exposure time is "1/10 seconds" as "10 to 30", the "brightness" range suited for photographing can be set to "20 to 40", added by "10" when the exposure time is "1/20 seconds", which is 1/2 times. The exposure time can be set to cover the "brightness" range of "10 to 100" in correspondence to the range of "1/10 seconds" to "1/1280 seconds" by sequentially setting in such a manner.

Furthermore, a configuration in which a plurality of exposure times covers each "brightness" range is preferred. In the example shown in FIG. 6, setting is such that at least two exposure times cover the range in the range where the "brightness" range is from 10 to 90. In other words, the exposure time where the "brightness" corresponds to "50" is "1/40 seconds", "1/80 seconds", and "1/160 seconds". According to such setting the photographing of a plurality of times can be selected with different exposure times even if the "brightness" upper and lower limit range (to be described later) inputted by the user is narrow.

The relationship between the exposure time and the "brightness" range shown in FIG. 6 is such that the photographing at each of the plurality of exposure times corresponding to the setting is performed when the necessary "brightness" range is set by the user of the "brightness" range in which the photographing can be performed with the imaging unit 8. In other words, the processing time related to the image synthesizing process can be reduced by performing only the photographing at the specific exposure time instead of performing the photographing at all exposure times that can be set to the imaging unit 8.

More specifically, when the "brightness" range is set to "30 to 60" by the user, three times of photographing per one process are performed at the exposure time of "1/20 seconds", "1/40 seconds", and "1/80 seconds" included in such a range. In particular, in the image processing device according to the present embodiment, the photographing is performed such that the "brightness" range corresponding to the variation range of the photographing environment can be covered, as described later.

Again referring to FIG. 4, the luminance synthesizing unit 210 calculates the synthetic luminance of the luminance of each pixel of the synthetic image using a plurality of input image data acquired by a series of photographing with respect to the workpiece 2. More specifically, the luminance synthesizing unit 210 standardizes the luminance of each pixel in the P pieces of input image data corresponding to each pixel (coordinate position i) of the synthetic image data with the exposure time to calculate the synthetic luminance $E_i$ of each pixel. The calculation formula of the synthetic luminance $E_i$ by the luminance synthesizing unit 210 is as expressed in equation (1).

$$\ln E_i = \frac{\sum_{j=1}^{P} w(Z_{i,j})(\ln g(Z_{i,j}) - \ln \Delta t_j + C)}{\sum_{j=1}^{P} w(Z_{i,j})} \quad (1)$$

Where, w(Z): weighting function,
g(Z): response function of imaging element
$Z_{i,j}$: luminance information at coordinate position i of $j^{th}$ input image datum
$\Delta t_j$: exposure time of $j^{th}$ input image datum In equation (1), the term "$\ln(g(Z_{i,j})-\ln \Delta t_j)$" is equivalent to the value obtained by standardizing the luminance in each input image data with the exposure time and evaluating as the "brightness". This is based on the technical idea that even if the luminance is the same "128", the actual "brightness" is to be evaluated as a greater value if the exposure time is relatively short, and the actual "brightness" is to be evaluated as a smaller value if the exposure time is relatively long. In other words, the standardization ($=g(Z_{i,j})/\Delta t_j$) by the exposure time is performed by multiplying the coefficient $1/\Delta t_j$ corresponding to the exposure time at the time of photographing of the corresponding input image data so that the term can be transformed as $\ln\{g(Z_{i,j})/\Delta t_j\}$, and then the synthetic luminance Ei is calculated using the standardized value.

Representatively, the synthetic luminance Ei is calculated as a value in the range of 0 to 100 according to the relationship between each exposure time and the "brightness" range shown in FIG. 6. For the sake of facilitating the understanding, the synthetic luminance is expressed in the range of from 0 to 100, but the tone of "brightness" of the image obtained by synthesizing becomes greater than the tone (e.g., 8 bits) of the image obtained in one photographing, and thus is a value having digits of after the decimal point as the data (e.g., handled as a value up to four digits after the decimal point using data of 16 bits).

In the above equation, the weighting function w(Z) and the response function g(Z) of the imaging element of the imaging unit 8 are introduced. Such functions will be described with reference to FIGS. 7A and 7B.

FIGS. 7A and 7B are diagrams showing one example of characteristics of the weighting function and the response function. FIG. 7A shows the characteristic of the weighting function w(Z), and FIG. 7B shows the characteristic of the response function g(Z).

With reference to FIG. 7A, the weighting function w(Z) is a function reflecting the reliability in accordance with the value of the luminance outputted from the imaging unit 8. In other words, the value close to the lower limit (0) or the upper limit (255) of the luminance outputted from the imaging unit 8 at a certain exposure time is assumed to have low reliability compared to the value close to an intermediate value (128). In other words, if the imaging unit 8 photographs the measuring article having the most suitable "brightness" at a certain exposure time, the luminance is assumed to be at substantially the intermediate value.

In view of such characteristics, a function in which the value in the vicinity of the lower limit or the upper limit becomes smaller compared to the vicinity of the intermediate value of luminance tone value is preferably used for the weighting function w(Z). By way of example, in the present embodiment, a weighting function in a triangular shape in which the intermediate value of the luminance tone value becomes a maximum value (128) and becomes zero at the lower limit and the upper limit is adopted. Of the input image data for every exposure time, that having a luminance within a predetermined range is preferentially adopted to calculate the synthetic luminance by adopting the above weighting function.

Using FIG. 7B, the response function g(Z) is a function for compensating for the nonlinearity between the luminance distribution outputted from the imaging unit 8 and the light energy distribution actually inputted to the imaging unit 8. For instance, in the imaging element such as the CCD, the relationship between the input light energy or the light quantity and the output voltage signal is nonlinear. Such a nonlinear characteristic is also referred to as, e.g., a gamma characteristic. The response function g(Z) compensates for such a gamma characteristic, and corrects the luminance outputted from the imaging unit 8 so as to be proportional to the light energy actually inputted to the imaging unit 8. In FIG. 7B, the response function g(Z) for a case in which the luminance outputted from the imaging unit 8 is in proportional relationship with the input light energy is shown for simplification.

The "C" of the constant term in the equation is a term for compensating the offset that occurs when the relationship between each exposure time and the "brightness" range is defined as in FIG. 6, and is appropriately set according to the relationship between each exposure time and the "brightness" range.

In the equation, a natural logarithm having the Napier number "e" as the base is used, but is not necessarily limited to "e", and the logarithm having "2" as the base or the common logarithm having "10" as the base may be used.

Again referring to FIG. 5, the luminance synthesizing unit 210 outputs the calculated synthetic luminance Ei to the histogram generation unit 218. The histogram generation unit 218 generates the histogram for the synthetic luminance Ei. In other words, the histogram generation unit 218 generates distribution data for displaying the distribution of the synthetic luminance Ei on the monitor 102. More specifically, the luminance synthesizing unit 210 sectionalizes the synthetic luminance Ei of each pixel into classes of a predetermined width, and then calculates the frequency of each class. This helps the user to initially set the "brightness" upper limit and the "brightness" lower limit while referencing the range of relatively high ratio of the synthetic luminance Ei calculated by the luminance synthesizing unit 210.

The histogram generation unit 218 is configured to be able to interrupt or resume the histogram generation process according to the user setting.

(3) Tone Value Conversion Process

Again referring to FIG. 5, the tone mapping unit 214 converts the synthetic luminance Ei calculated in the luminance synthesizing unit 210 to the tone value to be displayed on the monitor 102. Specifically, the tone mapping unit 214 determines the concentration of the synthetic image data by assigning the synthetic luminance Ei of each pixel (luminance range: 0 to 100; having tone greater than 256 tones) to the tone value Yi (e.g., 0 to 255 tone values) of the corresponding pixel of the synthetic image data. The resolution (dynamic range) of the synthetic luminance Ei of each pixel becomes higher than the input image data, and thus the synthetic image data of higher accuracy can be generated and displayed by segmenting the tone value of the synthetic image data more finely than the tone value of the input image data.

The tone mapping unit 214 executes the conversion from the synthetic luminance Ei to the tone value Yi according to the correspondence relationship sequentially updated (followed up) by the follow-up unit 230. Specifically, the tone mapping unit 214 receives the set values of the "brightness" upper and lower limits to be performed with the assignment to the tone value from the follow-up unit 230, and converts the synthetic luminance Ei in the relevant range to the corresponding tone value Yi. The distribution of the tone value Yi is equivalent to the distribution of the defined range tone value indicated by the tone values within the defined numerical range.

Figure 8A:
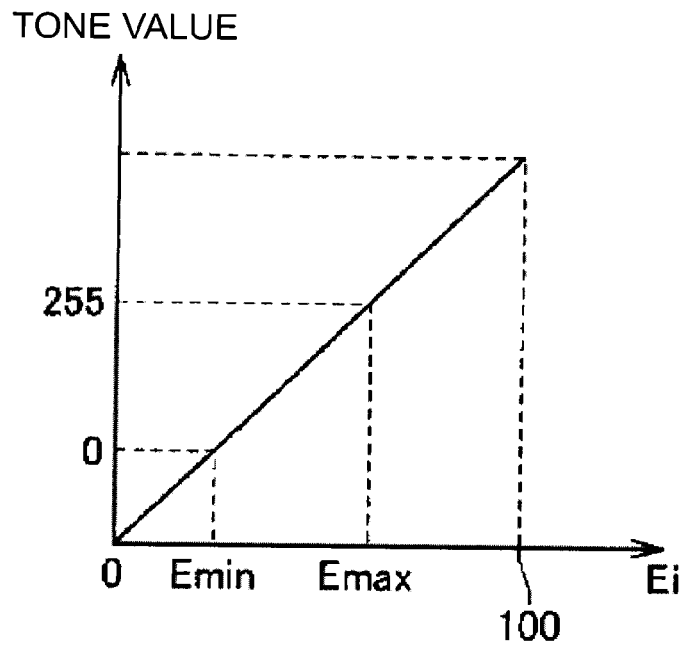
FIGS. 8A and 8B are diagrams describing an assignment process by the tone mapping unit.
Figure 8B:
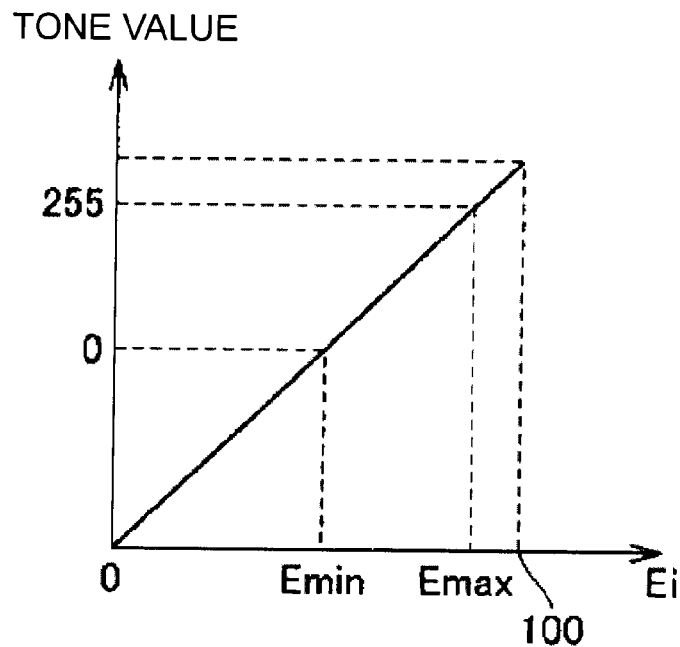

FIGS. 8A and 8B are diagrams describing an assignment process by the tone mapping unit 214. With reference to FIG.

8, a case where the tone mapping unit 214 performs a linear assignment process will be illustrated to simplify the description. The simplest example includes assigning to the tone value within the range of 0 to 255 while maintaining the proportional relationship of the synthetic luminance Ei of which the luminance range is from 0 to 100. The data having a greater tone than the display ability of the monitor thus can be displayed with the tone (e.g., eight bit display) complying with the display ability of the monitor.

As described above, when the "brightness" upper limit Emax and the "brightness" lower limit Emin are set, the tone mapping unit 214 performs assignment to the tone value Yi according to the following equation.

$$Yi = 255 \times (Ei - Emin) / (Emax - Emin)$$

In other words, the correspondence relationship used in the conversion from the synthetic luminance Ei to the tone value Yi in the tone mapping unit 214 is appropriately updated by changing the "brightness" upper limit Emax and the "brightness" lower limit Emin.

The pixels having a synthetic luminance Ei greater than the "brightness" upper limit Emax are all converted to a maximum tone value (e.g., 255), and thus the information on such brightness is lost. Similarly, the pixels having a synthetic luminance Ei smaller than the "brightness" lower limit Emin are all converted to a minimum tone value (e.g., 0), and thus the information on such brightness is lost. Therefore, only the pixel of which the value of the synthetic luminance Ei is in the range from the "brightness" lower limit Emin to the "brightness" upper limit Emax becomes a pixel having an effective tone value on the synthetic image data.

In the following description, the range from the "brightness" lower limit Emin to the "brightness" upper limit Emax is also referred to as "brightness" upper and lower limit range, which "brightness" upper and lower limit range is equivalent to a "first range" of the present invention.

In other words, the "brightness" upper and lower limit range refers to a range included in the effective dynamic range of the synthetic luminance Ei and narrower than the effective dynamic range of the synthetic luminance Ei. The synthetic luminance Ei in the "brightness" upper and lower limit range is converted in correspondence to the tone value Yi, i.e., a default range tone value represented with the tone value in a default numerical range, and the distribution of the synthetic luminance Ei is converted to the distribution of the tone value Yi equivalent to the default range tone value distribution.

Calculation Example

By way of example, in a case where the input image data are acquired by performing photographing at three exposure times of "1/20 seconds", "1/40 seconds", and "1/80 seconds", the luminances at the coordinate position i of the three input image data are "190", "100", and "50". In such a case, the synthetic luminance Ei of the pixel corresponding to the coordinate position i is calculated as below. Here, W(190) =65, W(100)=100, W(50)=50.

$$Ei = 10 \times \{65 \times (\log 190 + \log 20 - 8) + 100 \times (\log 100 + \log 40 - 8) + 50 \times (\log 50 + \log 80 - 8)\} / (65 + 100 + 50) = 40$$

When the "brightness" upper limit Emax is set to "60" and the "brightness" lower limit Emin is set to "30" by the user, the tone values Yi at the coordinate position i of the synthetic image data are calculated in the following manner.

$$Yi = 255 \times (40 - 30) 460 - 30) = 85$$

(4) Color Synthesizing Process

Again referring to FIG. 5, the color synthesizing unit 208 calculates the synthesized color information from the color information of a plurality of input image data. As described later, the synthetic image data is obtained by multiplying the corresponding tone value (concentration) calculated by the tone mapping unit 214 to the synthesized color information of each pixel calculated by the color synthesizing unit 208. Thus, the synthesized color information outputted from the color synthesizing unit 208 takes a value indicating a relative ratio of "red", "green", and "blue" without the information on the concentration of each pixel.

Similar to the above luminance synthesizing unit 210, the color synthesizing unit 208 calculates the synthesized color information of each pixel of the synthetic image data based on the color information of each pixel in a plurality of input image data corresponding to each coordinate position. More specifically, the color synthesizing unit 208 calculates the synthesized color information by cumulatively adding the value obtained by multiplying the color information of each input image data and the weight corresponding to the reliability thereof.

Assume the color information at the coordinate position i ($0 \leq i \leq$ the number of pixels n) of the $j^{th}$ input image datum is (ri, j, gi, j, bi, j). The color synthesizing unit 208 standardizes the color information outputted from the image information extraction units 206a to 206h so that ri, j+gi, j+bi, j=1 is satisfied. Assume the luminance at the coordinate position i of the $j^{th}$ input image datum is Zi, j. Using the standardized color information and the luminance, the calculation formula of the synthesized color information (ri, gi, bi) is as expressed in equations (2.1) to (2.3).

$$r_i = \frac{\sum_{j=1}^{P} w(Z_{i,j}) \cdot r_{i,j}}{\sum_{j=1}^{P} w(Z_{i,j})} \quad (2.1)$$

$$g_i = \frac{\sum_{j=1}^{P} w(Z_{i,j}) \cdot g_{i,j}}{\sum_{j=1}^{P} w(Z_{i,j})} \quad (2.2)$$

$$b_i = \frac{\sum_{j=1}^{P} w(Z_{i,j}) \cdot b_{i,j}}{\sum_{j=1}^{P} w(Z_{i,j})} \quad (2.3)$$

Here, w(Z): weighting function
P: the number of input image data

The weighting function w(Z) has a characteristic similar to FIG. 8A. In other words, the weighting function w(Z) is a function for reflecting the reliability according to the value of the luminance outputted from the imaging unit 8. The technical meaning of the weighting function w(Z) is as described above, and thus detailed description will not be repeated.

The color synthesizing unit 208 outputs the calculated synthesized color information to the image generation unit 212.

(5) Generation Process

The image generation unit 212 sequentially calculates the image information of the pixel at the coordinate position i by sequentially multiplying the tone value Yi calculated by the luminance synthesizing unit 210 and the tone mapping unit 214 to the corresponding synthesized color information (ri, gi, bi), and generates the synthetic image data.

In other words, the absolute color information (Ri, Gi, Bi) at the coordinate of the coordinate position i of the synthetic image data can be expressed as below.

$$(Ri, Gi, Bi) = Yi \times (ri, gi, bi)$$

The synthetic image data is generated according to the above procedure.

(Others)

The processing time calculation unit 222 calculates the prospective processing time required for the generation of one synthetic image datum. More specifically, the processing time calculation unit 222 estimates the processing time in view of the number of photographing times by the imaging unit 8, the exposure time in each photography, the processing amount of the image synthesizing process, and the like based on the information from the photographing control unit 200. The processing time is equivalent to the time necessary for generating one synthetic image datum in the operation mode, and the user determines the setting that can be applied to the actual production line with reference to such processing time.

Figure 9A:
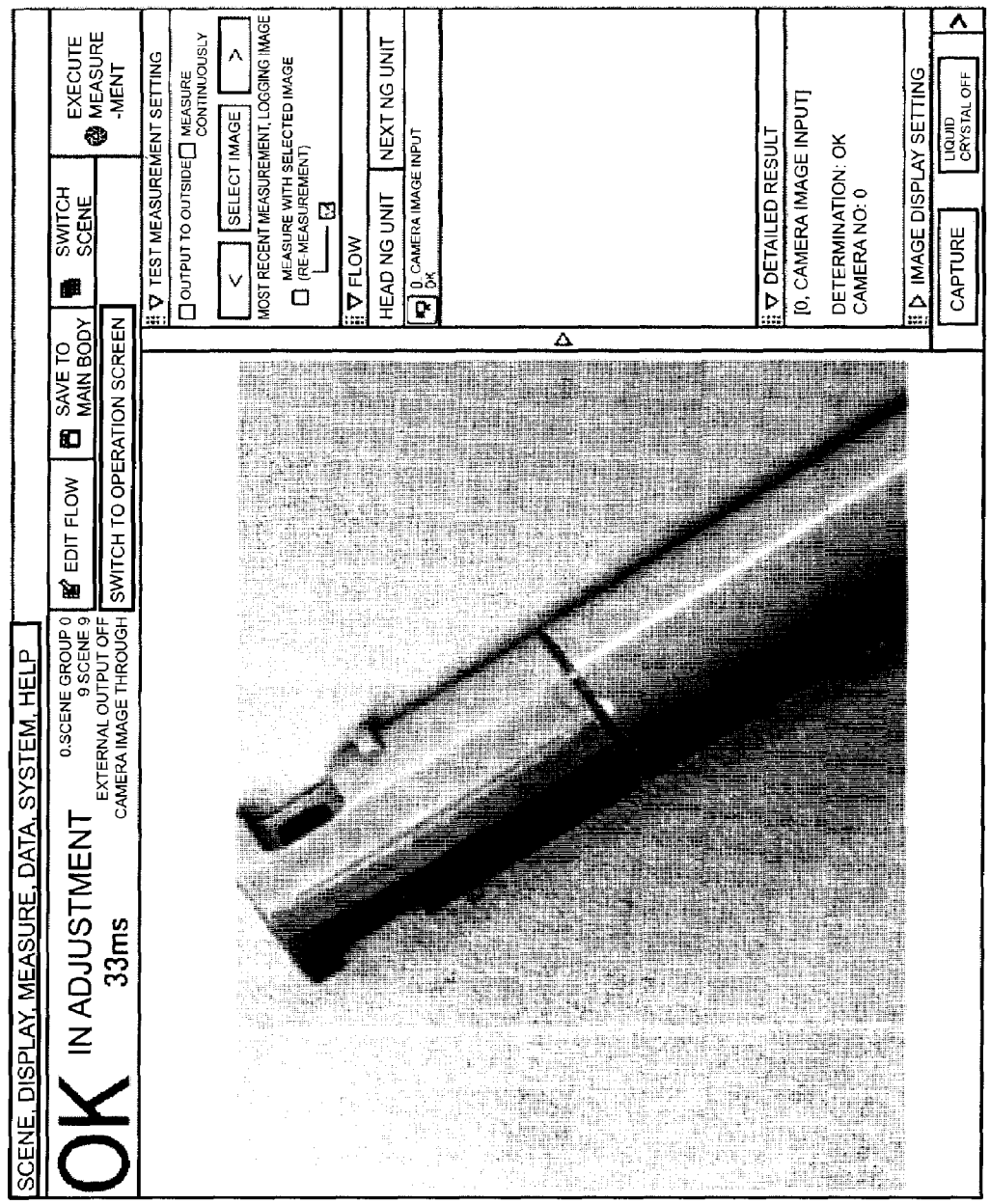
FIGS. 9A and 9B are diagrams showing one example of lowering of an image quality of the synthetic image data by the variation of the photographing environment.
Figure 9B:
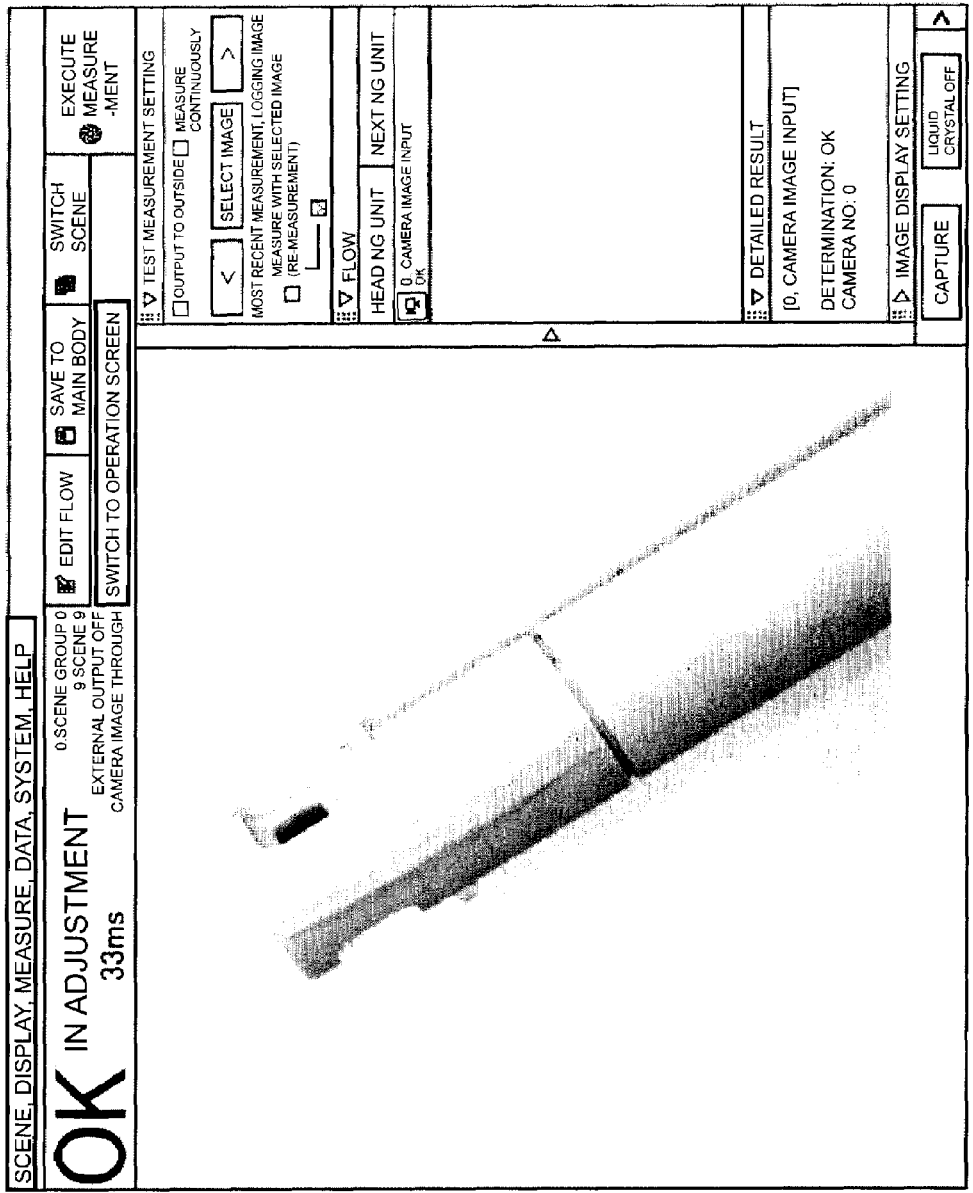

Example of Lowering in Image Quality of Synthetic Image Data Due to Variation of Photographing Environment FIGS. 9A and 9B are diagrams showing one example of lowering of image quality of the synthetic image data by the variation of the photographing environment. FIGS. 9A and 9B show a screen display example of the monitor 102 when the image processing device according to the present embodiment is in the "operation mode". In the screen display example shown in FIGS. 9A and 9B, the range to be the target of assignment to the effective tone value of the synthetic luminance Ei does not change in the tone mapping unit 214 shown in FIG. 5.

FIG. 9A shows a state immediately after the initial setting is completed in a certain photographing environment, and FIG. 9B shows a state where the photographing environment has changed with respect to FIG. 9A (more specifically, state with stronger lighting). As apparent from comparing FIG. 9A with FIG. 9B, the synthetic image data shown in FIG. 9B is whitish as a whole, and whiteout (halation) is partially produced. This is because the intensity of the reflected light from the workpiece is high.

<Outline of "Brightness" Follow-Up Process>

The outline of the "brightness" follow-up process according to the present embodiment will be described below.

Figure 10A:
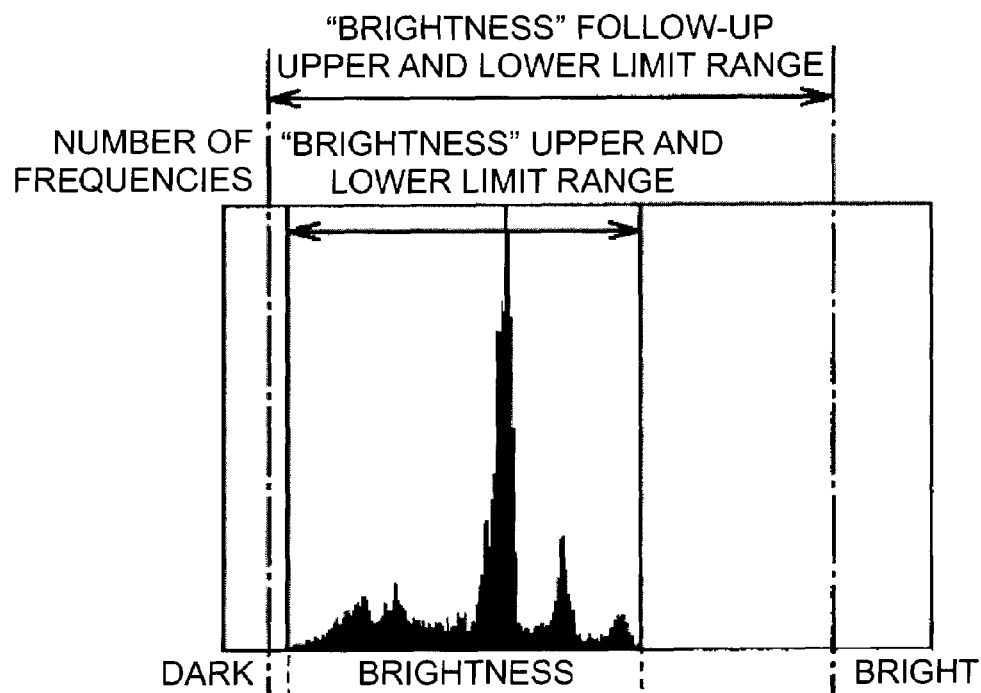
FIGS. 10A and 10B are diagrams showing one example of a histogram corresponding to the synthetic image data shown in FIGS. 9A and 9B.
Figure 10B:
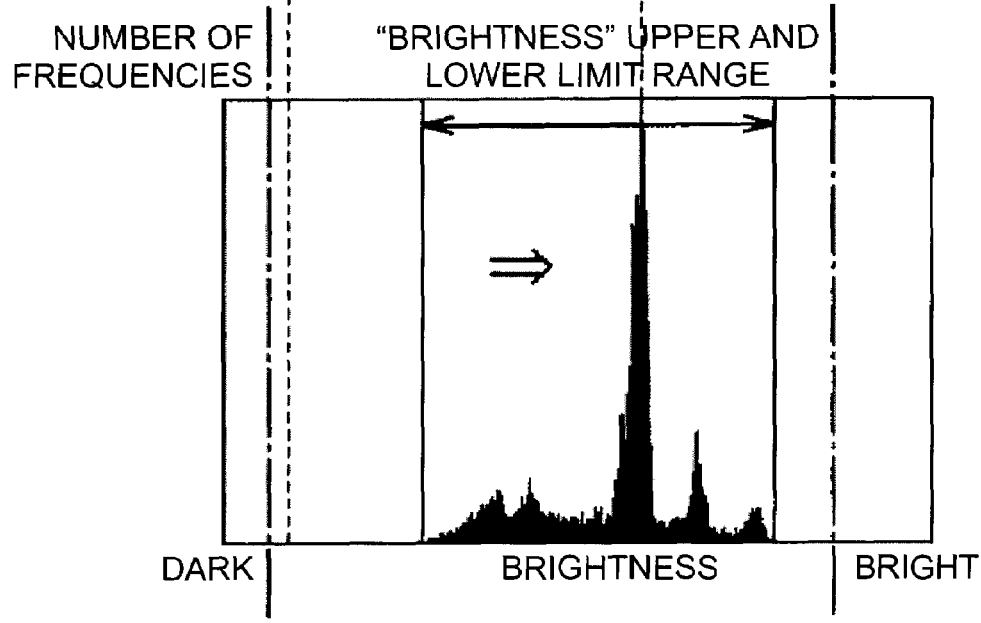

FIGS. 10A and 10B are diagrams showing one example of a histogram corresponding to the synthetic image data shown in FIGS. 9A and 9B. The histogram shown in FIG. 10A corresponds to the synthetic image data shown in FIG. 9A, and the histogram shown in FIG. 10B corresponds to the synthetic image data shown in FIG. 9B.

As shown in FIG. 10A, the "brightness" upper and lower limit range is set according to the spread of the synthetic luminance Ei at immediately after the completion of the initial setting. When the photographing environment changes after such setting, the distribution of the synthetic luminance Ei entirely shifts in the brightness direction. As a result, the distribution does not match the distribution of the synthetic luminance Ei where the initially set "brightness" upper and lower limit range is actually acquired.

In other words, as shown in FIGS. 10A and 10B, the synthetic image data including the effective image information cannot be generated even if the effective synthetic luminance Ei is calculated. Thus, the "brightness" upper and lower limit range is sequentially updated according to the shift of the synthetic luminance Ei.

More specifically, the "brightness" upper and lower limit range maintains the width of the initially set "brightness" upper and lower limit range and shifts the position thereof by the amount corresponding to the shift amount of the synthetic luminance Ei. In other words, the width of the dynamic range of the "brightness" upper and lower limit range before the shift (update) is the same width as the dynamic range of the "brightness" upper and lower limit range after the shift (update). According to such an updating process, the synthetic image data including the effective image information can be generated without being influenced by the photographing environment.

In other words, the "brightness" upper and lower limit range to be corresponded to the range of the tone value Yi, i.e., the default range tone value is updated to a range included in the effective dynamic range of the synthetic luminance Ei and narrower than the effective dynamic range according to the fluctuation of the light energy that enters the imaging element of the imaging unit 8. The "brightness" upper and lower limit range after the update differs from the "brightness" upper and lower limit range before the update.

The reflectivity of the same subject (including the workpiece 2 and the conveyance mechanism 6) is assumed to be substantially constant. Thus, the shift amount of the synthetic luminance Ei can be determined by monitoring the temporal change of the synthetic luminance Ei with respect to one or more pixels. For instance, assuming the average values of the synthetic luminances Ei at a plurality of specific pixels is E0 at the time of the initial setting, if the average value of the synthetic luminance Ei at the same plurality of pixels at a certain point in time thereafter changes to Eave, the deviation $\Delta E = |Eave - E0|$ corresponds to the shift amount.

The image processing device according to the present embodiment thus updates (shifts) the "brightness" upper and lower limit range according to such shift amount.

Such update (shift) of the "brightness" upper and lower limit range is executed such that the tone value distribution obtained by the "brightness" upper and lower limit range after the update becomes substantially the same as the tone value distribution obtained by the "brightness" upper and lower limit range of before the correction. In other words, the update (shift) of the "brightness" upper and lower limit range is executed such that the histogram shape having the "brightness" upper and lower limit range as the reference shown in FIG. 10A and the histogram shape having the "brightness" upper and lower limit range as the reference shown in FIG. 10B substantially match.

As shown in FIGS. 10A and 10B, a plurality of input image data needs to be acquired in advance so as to cover the distribution of the synthetic luminance Ei that shifts by the variation of the photographing environment to update the "brightness" upper and lower limit range. That is, the workpiece 2 needs to be photographed with a dynamic range wider than the variation width of the photographing environment.

The workpiece can be photographed at as great as possible number of photographing times so as to respond more widely to the variation of the photographing environment. However, the time for generating one synthetic image datum increases with increase in the number of photographing times.

In the FA field and the like, the time that can be assigned to the test of one workpiece is sometimes limited due to the takt time or the like of the entire line. Thus, the number of photographing times with respect to one workpiece may not be increased without limitation. In such case, the range that can respond to the variation of the photographing environment is preferably set. In the following description, the range that can respond to the variation of the photographing environment is referred to as "brightness" follow-up upper and lower limit range, and the "brightness" follow-up upper and lower limit range is equivalent to a "second range of the present invention.

That is, the update of the "brightness" upper and lower limit range equivalent to the "first range" is permitted within the "brightness" follow-up upper and lower limit range equivalent to the "second range".

The time necessary for the generation of one synthetic image datum is suppressed from varying with the variation of the photographing environment as the number of photographing times with respect to the workpiece 2 and the exposure time at each photographing can be defined by setting the "brightness" follow-up upper and lower limit range in advance.

Example of Effect of "Brightness" Follow-Up Process

Figure 11A:
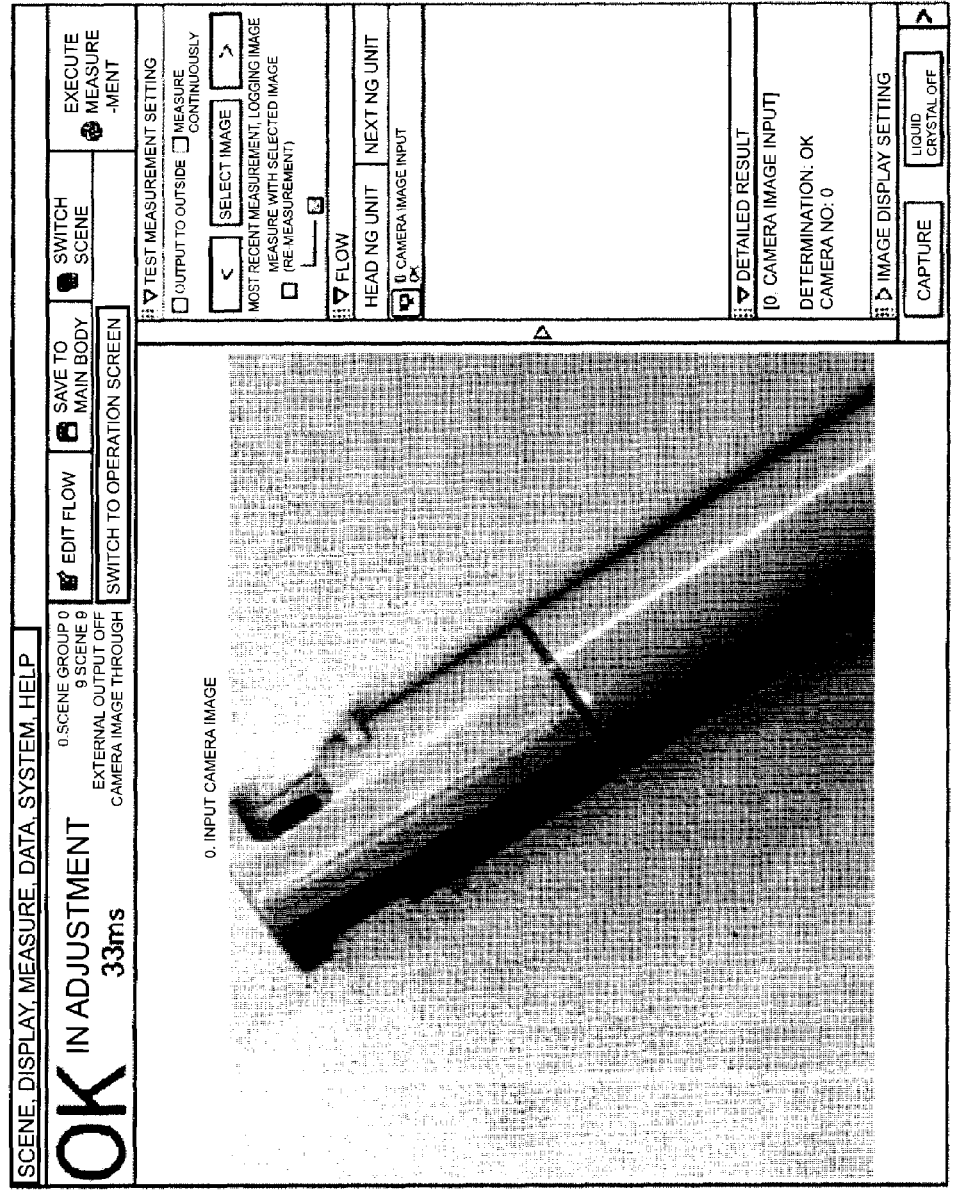
FIGS. 11A and 11B are diagrams showing one example of the effect of the "brightness" follow-up process according to the embodiment of the invention.
Figure 11B:
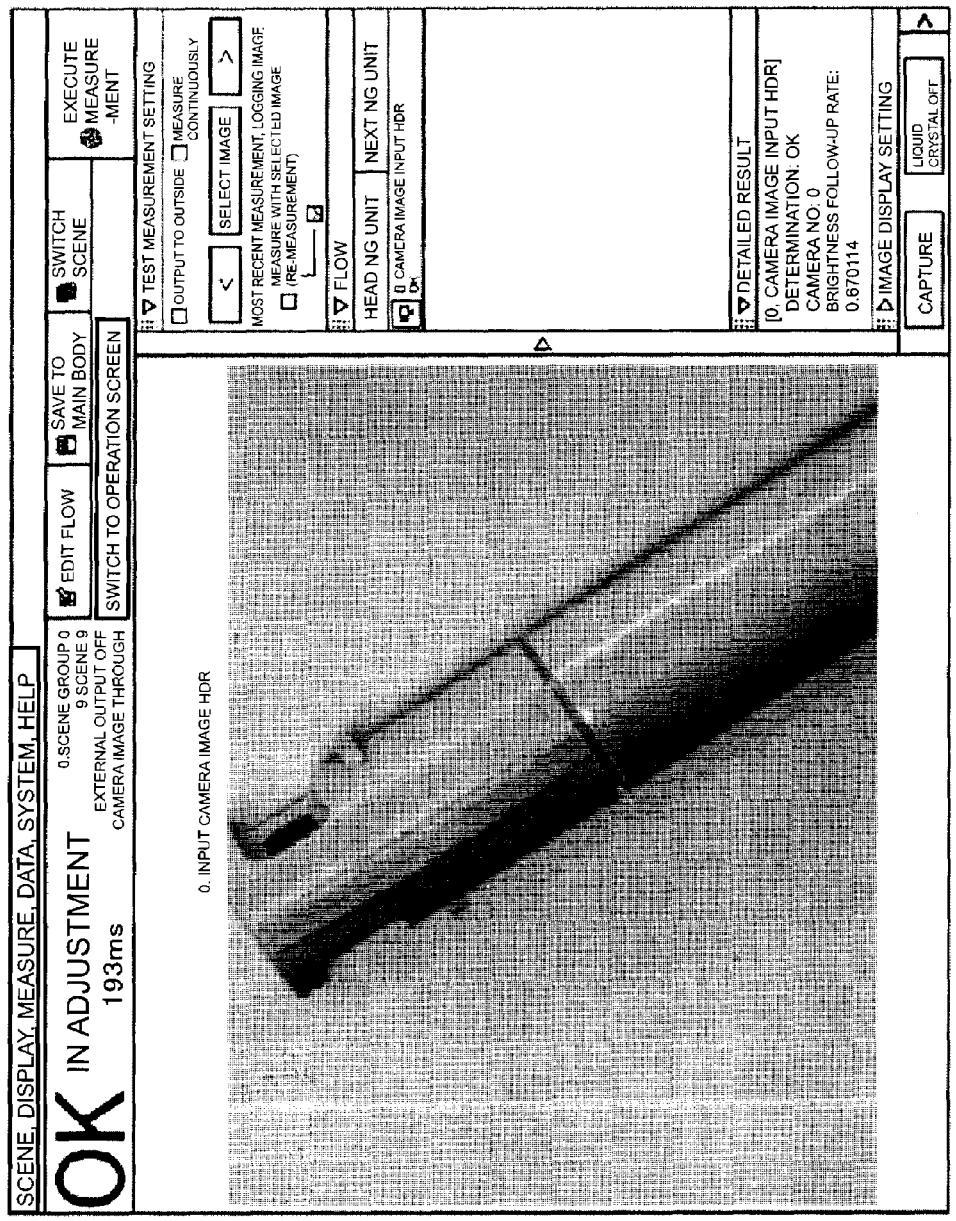

FIGS. 11A and 11B are diagrams showing one example of the effect of the "brightness" follow-up process according to the embodiment of the invention. Similar to FIG. 9A, FIG. 11A shows a state immediately after the initial setting is completed in a certain photographing environment, and FIG. 11B shows a state where the photographing environment has changed with respect to FIG. 11A (more specifically, state with stronger lighting). As apparent from comparing FIG. 11A with FIG. 11B, the synthetic image data including the effective image information can be generated without being influenced by the variation of the photographing environment by using the "brightness" follow-up process according to the present embodiment.

<Control Structure of "Brightness" Follow-Up Process>

Figure 12:
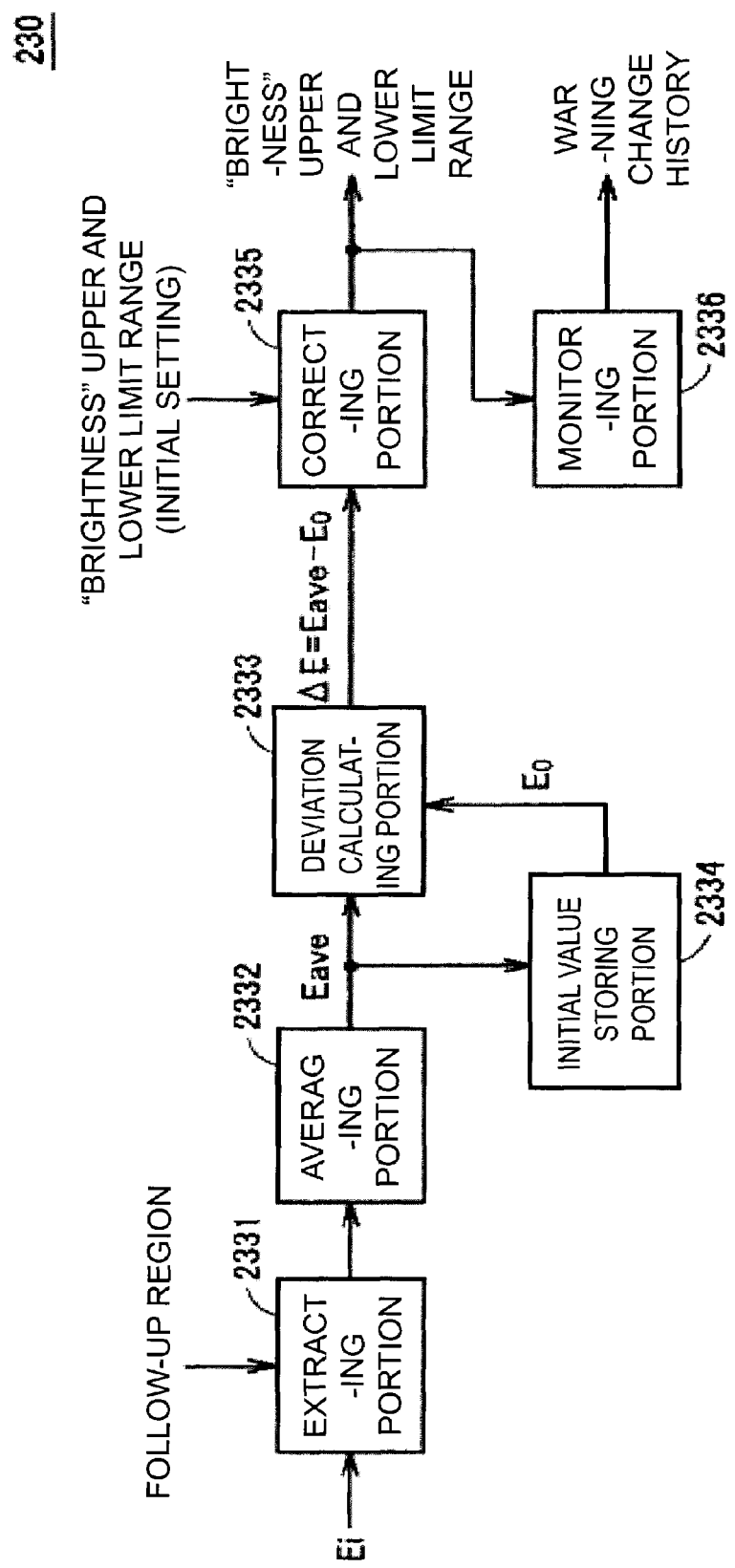
FIG. 12 is a function block diagram showing a more detailed control structure of the follow-up unit 230 shown in FIG. 5.

FIG. 12 is a function block diagram showing a more detailed control structure of the follow-up unit 230 shown in FIG. 5.

With reference to FIG. 12, the follow-up unit 230 includes, as the control structure, an extracting portion 2331, an averaging portion 2332, a deviation calculating portion 2333, an initial value storing portion 2334, a correcting portion 2335, and a monitoring portion 2336.

The extracting portion 2331 accepts the setting of the follow-up region with respect to the input image data, as described later. The extracting portion 2331 extracts the synthetic luminance Ei of the pixel existing within the set follow-up region of the synthetic luminance Ei sequentially outputted from the luminance synthesizing unit 210 (FIG. 5). The extracting portion 2331 then outputs the extracted synthetic luminance Ei of each pixel to the averaging portion 2332.

The averaging portion 2332 calculates the representative value of the synthetic luminance Ei for the pixel contained in the follow-up region. Specifically, the averaging portion 2332 averages the synthetic luminance Ei of each pixel received from the extracting portion 2331, and calculates the average synthetic luminance Eave. The averaging portion 2332 then outputs the calculated average synthetic luminance Eave to the deviation calculating portion 2333 and the initial value storing portion 2334. Some kind of disturbance may be contained in the pixel in the follow-up region, and thus an intermediate value process may be adopted in place of the averaging process or in addition to the averaging process for the method of calculating the representative value.

The initial value storing portion 2334 stores as the initial synthetic luminance E0 the average synthetic luminance Eave calculated in the averaging portion 2332 immediately after the follow-up region with respect to the input image data is set or changed. In other words, the initial value storing portion 2334 holds the average synthetic luminance Eave immediately after the follow-up region is set or changed as the reference value for evaluating the variation of the photographing environment.

The deviation calculating portion 2333 sequentially calculates the deviation $\Delta E$ with respect to the initial synthetic luminance E0 received from the averaging portion 2332 of the average synthetic luminance Eave sequentially calculated by the averaging portion 2332. In other words, the deviation $\Delta E$ is the value indicating the variation amount from the photographing environment at the point in time the follow-up region is set or changed. The deviation calculating portion 2333 outputs the deviation $\Delta E$ to the correcting portion 2335.

The correcting portion 2335 updates (shifts) the "brightness" upper and lower limit range according to the deviation $\Delta E$ received from the deviation calculating portion 2333. The correcting portion 2335 accepts in advance the initial value Emax0 and Emin0 of the "brightness" upper and lower limit range ("brightness" upper limit and lower limit), where the "brightness" upper limit and the lower limit after the update are (Emax0+$\Delta E$) and (Emin0+$\Delta E$), respectively. The "brightness" upper and lower limit range that can be set by the user is within the effective dynamic range of the synthetic luminance Ei, and is limited to within the "brightness" follow-up upper and lower limit range.

The correcting portion 2335 adds the deviation $\Delta E$ to the "brightness" upper limit and the lower limit accepted as the initial values to output the "brightness" upper and lower limit range after the update. The "brightness" upper and lower limit range after the update calculated by the correcting portion 2335 is provided to the tone mapping unit 214 (FIG. 5). The correcting portion 2335 sequentially outputs the "brightness" upper and lower limit range after the update to the monitoring portion 2336.

The monitoring portion 2336 provides presence of abnormality in the "brightness" follow-up process, the user guidance, and the like based on the "brightness" upper and lower limit range after the update calculated by the correcting portion 2335.

As a specific example, the monitoring portion 2336 stores the temporal change history of the "brightness" upper and lower limit range after the update and also displays the history on the monitor 102. The monitoring portion 2336 may set the appropriate "brightness" follow-up upper and lower limit range or notify the range of the user based on the temporal change history of the "brightness" upper and lower limit range after the update. Furthermore, the monitoring portion 2336 executes an error process such as notifying a warning or storing a state value (log) of that time when the "brightness" upper and lower limit range after the update exceeds the "brightness" follow-up upper and lower limit range set in advance. In other words, the error process is executed when part of the "brightness" upper and lower limit range is updated outside the "brightness" follow-up upper and lower limit range, that is, when part of the "brightness" upper and lower limit range is updated outside the effective dynamic range thereof.

<Process in Operation Mode>

As described above, in the "brightness" follow-up process according to the present embodiment, the number of photographing times and the exposure time in each photographing are defined so as cover the "brightness" follow-up upper and lower limit range set in advance.

Figure 13:
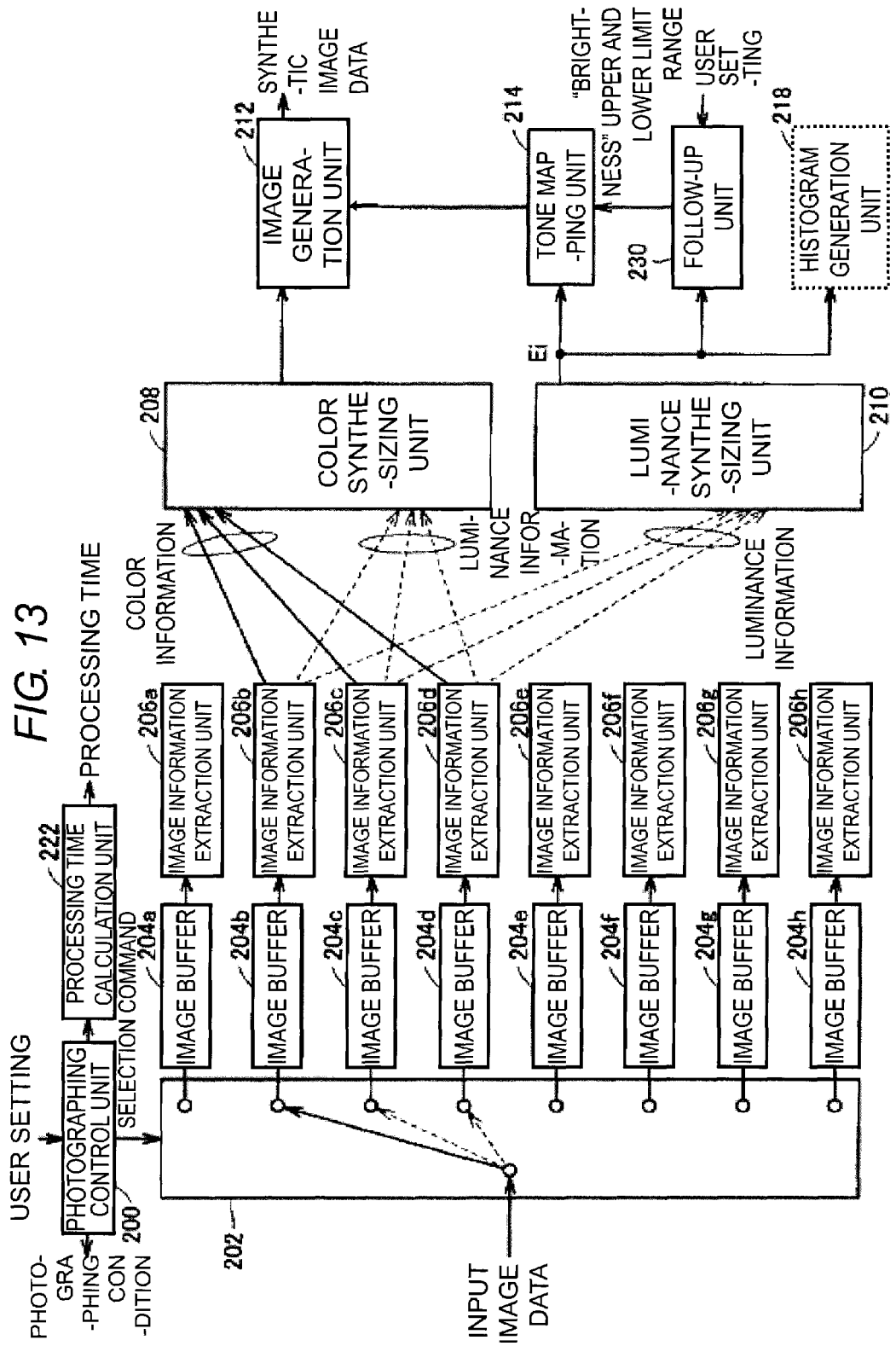
FIG. 13 is a diagram describing the operation of the control structure in the "operation mode" of the image processing device according to the embodiment of the present invention

FIG. 13 is a diagram describing the operation of the control structure in the "operation mode" of the image processing device according to the embodiment of the present invention.

With reference to FIG. 13, the imaging unit 8 performs photographing while being sequentially set with three corresponding exposure times if the "brightness" follow-up upper and lower limit range can be covered with three times of photographing by way of example. In the "operation mode", the generation process of histograms in the histogram generation unit 218 is interrupted.

Accompanied therewith, the input image data are outputted only from three image buffers 204 of the eight image buffers 204. Thus, if the histogram is selected to be in non-display, the photographing time and the processing time by the imaging unit 8 can be made efficient, and the entire processing time can be reduced.

Screen Display Example

FIGS. 14 to 18 are diagrams showing screen display examples in the "setting mode" displayed on the monitor 102 of the image processing device according to the embodiment of the present invention. The setting screens as shown in FIGS. 14 to 18 can be displayed by cooperatively operating the CPU 105, the graphic board (not shown), and the like. Such screen display is achieved by a GUI (Graphical User Interface) program incorporated as part of the OS (Operating System), which GUI also provides an environment for the user to carry out various user settings using the cursor on the screen operated by the keyboard 103 and the mouser 104.

Figure 14:
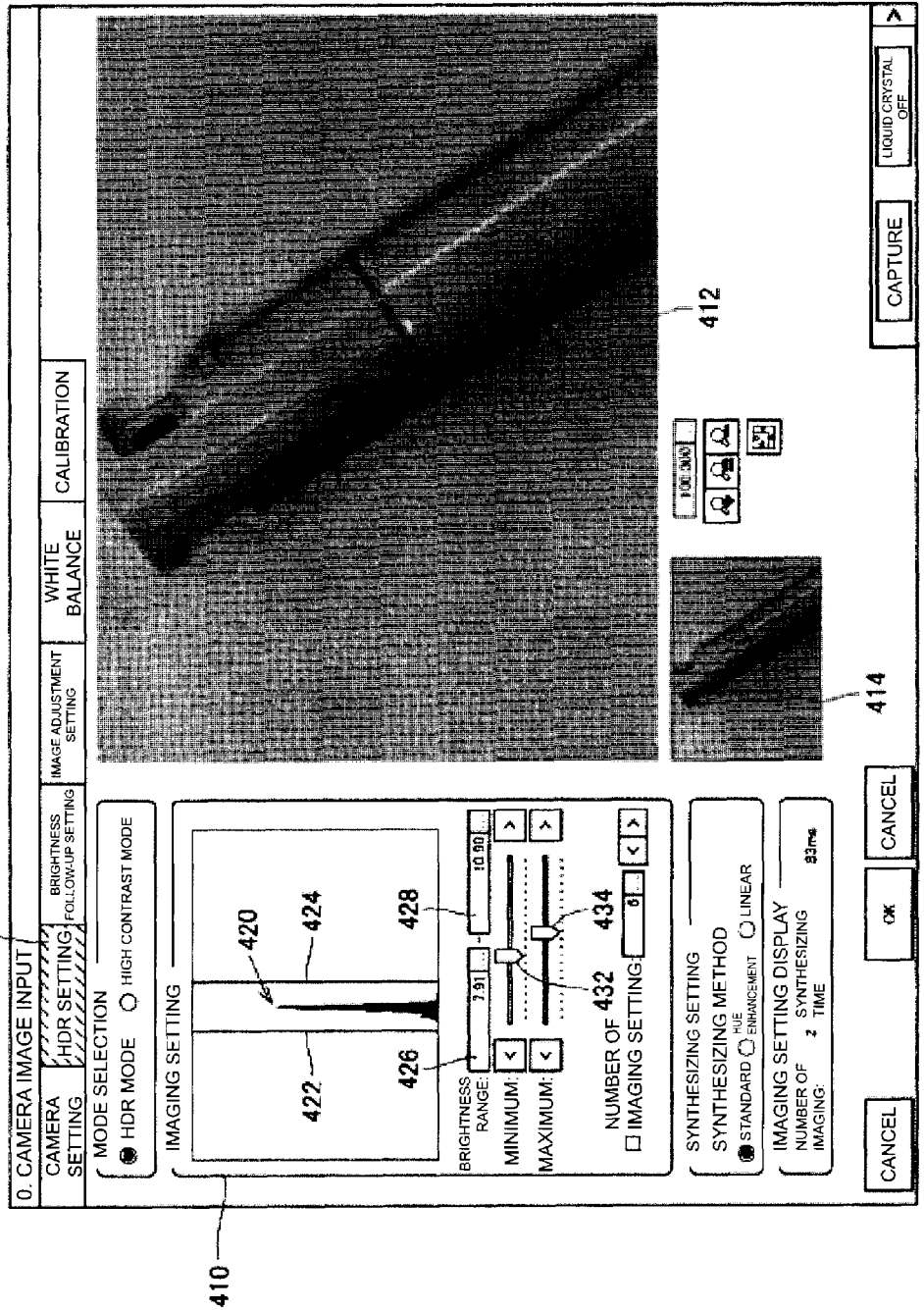
FIG. 14 is a diagram showing a screen display example (I) in the "setting mode" displayed on the monitor of the image processing device according to the embodiment of the present invention.

With reference to FIG. 14, when the user selects an "HDR set" tab 416, a setting mode screen 402 is displayed. Other initial setting (setting of imaging unit 8 and the like) is assumed to be completed.

The user first sets the initial value of the "brightness" upper and lower limit range ("brightness" upper limit and lower limit) in the setting mode screen 402.

More specifically, the setting mode screen 402 includes an imaging setting input area 410, a synthetic image display area 412, and an entire synthetic image display area 414.

The imaging setting input area 410 displays a histogram 420 on the "brightness" of the synthetic image data and also displays indicators 422 and 424 indicating the user set "brightness" upper limit and lower limit, respectively, on the same axis. The histogram 420 is sequentially generated by the histogram generation unit 218 (FIG. 5).

The imaging setting input area 410 also displays a slide bar 432 for setting the "brightness" lower limit and a slide bar 434 for setting the "brightness" upper limit. The "brightness" upper and lower limit range set through the operation of the slide bars 432 and 434 is inputted to the follow-up unit 230 shown in FIG. 5 (more specifically, the correcting portion 2335 shown in FIG. 12). The imaging setting input area 410 also displays numerical input boxes 426 and 428 for accepting the direct numerical input of the "brightness" lower limit and upper limit.

The user operates the slide bar 432 or 434, or the numerical input box 426 or 428 while referencing the displayed histogram 420 to set a desired "brightness" upper and lower limit range. The range that can cover substantially the entire histogram 420 is preferred for the "brightness" upper and lower limit range of the initial value. The display positions of the indicators 422 and 424 are updated according to such user setting.

In the synthetic image display area 412, the synthetic image data generated according to the user set "brightness" upper and lower limit range is displayed. The synthetic image data displayed in the synthetic image display area 412 displays the synthetic image data used in tests and measurements in the operation mode, and the user adjusts the lighting condition, the "brightness" upper and lower limit range, and the like on the workpiece 2 with reference to the display of the synthetic image display area 412. The synthetic image displayed in the synthetic image display area 412 is updated in real time, and thus when the "brightness" upper and lower limit range is changed by user operation as described above, the synthetic image data generated according to the "brightness" upper and lower limit range after the change is displayed.

In the synthetic image display area 412, the synthetic image data can be displayed in an enlarged manner.

The entire synthetic image display area 414 entirely displays the synthetic image data, similar to the synthetic image display area 412. In other words, even if the synthetic image data is displayed in an enlarged manner in the synthetic image display area 412, that is, even if one part of the synthetic image data is displayed, the entire synthetic image data is displayed in the entire synthetic image display area 414. The user thus can enlarge and observe the portion (region) of interest while grasping the entire synthetic image data.

The "number of photographs", the "synthesizing time", and the like are also displayed in the setting mode screen 402. Such information is calculated by the processing time calculation unit 222 (FIG. 5).

When the initial setting of the "brightness" upper and lower limit range is completed, the user subsequently sets the "brightness" follow-up upper and lower limit range on the setting mode screen 404 shown in FIG. 15.

Figure 15:
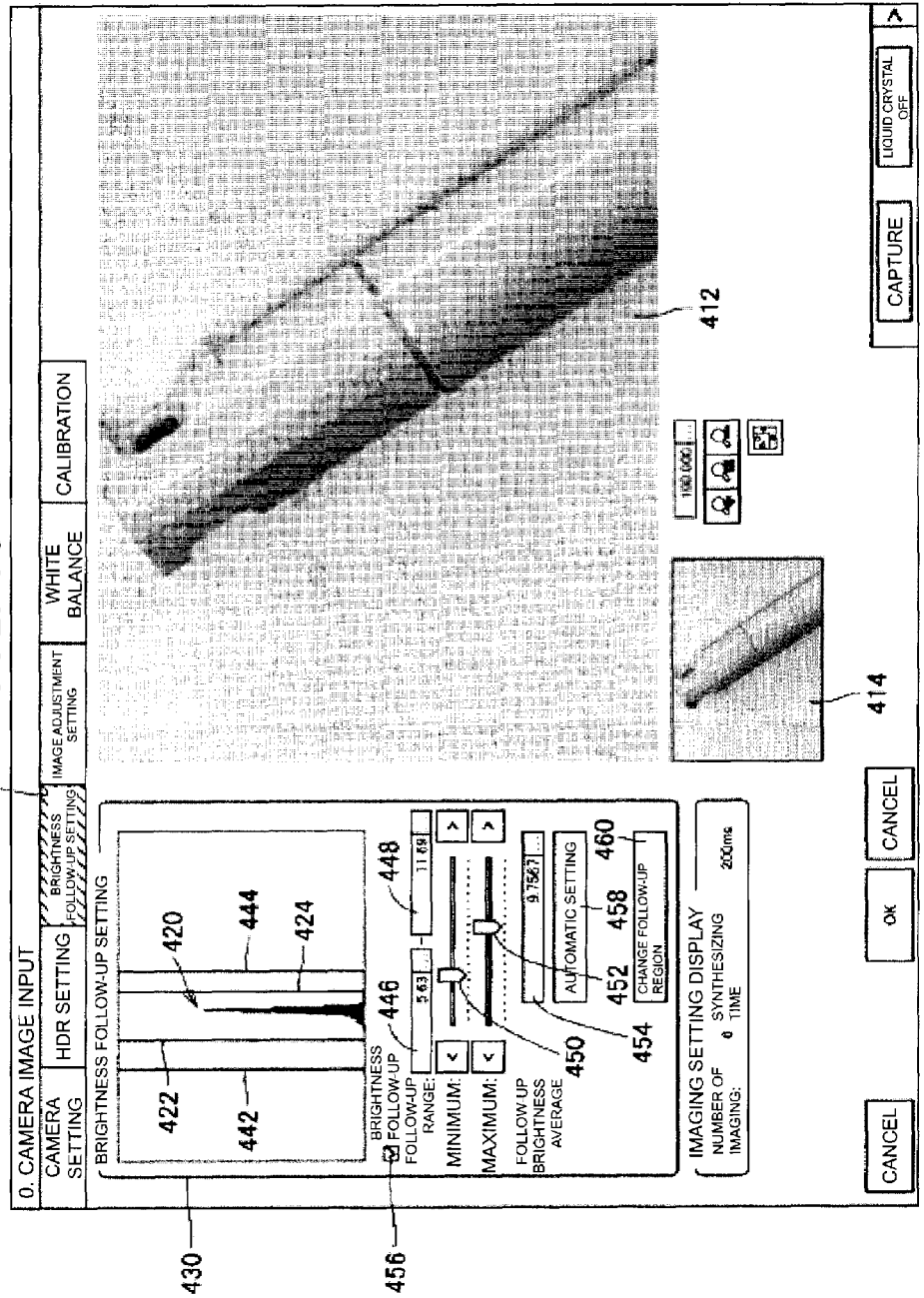
FIG. 15 is a diagram showing a screen display example (II) in the "setting mode" displayed on the monitor of the image processing device according to the embodiment of the present invention.

When the user selects the "brightness follow-up setting" tab 418 with reference to FIG. 15, the setting mode screen 404 is displayed. The setting mode screen 404 includes a brightness follow-up setting input area 430, the synthetic image display area 412, and the entire synthetic image display area 414.

The brightness follow-up setting input area 430 displays a histogram 420 on the "brightness" of the synthetic image data as well as the indicators 422 and 424 indicating the initially set "brightness" upper limit and lower limit. Furthermore, the indicators 442 and 444 indicating the user set "brightness" follow-up upper limit and lower limit are displayed on the same axis as the histogram 420. In other words, the "brightness" follow-up upper and lower limit range, i.e., the "second range" is simultaneously displayed with the histogram 420, i.e., the distribution of the synthetic luminance Ei on the monitor 102.

The brightness follow-up setting input area 430 displays a slide bar 450 for setting the "brightness" follow-up lower limit, and a slide bar 452 for setting the "brightness" follow-up upper limit. The "brightness" follow-up upper and lower limit range set through the operation of the slide bars 450 and 452 is inputted to the follow-up unit 230 shown in FIG. 5 (more specifically, correcting portion 2335 shown in FIG. 12). The imaging setting input area 410 also displays numerical input boxes 446 and 448 for accepting the direct numerical input of the "brightness" follow-up lower limit and follow-up upper limit.

The user operates the slide bar 450 or 452, or the numerical input box 446 or 448 while referencing the displayed histogram 420 to set a desired "brightness" follow-up upper and lower limit range. The display positions of the indicators 442 and 444 are updated according to such user setting.

The user operates the slide bar 450 or 452 or the numerical input box 446 or 448 and sets the desired "brightness" follow-up upper and lower limit range while referencing the displayed histogram 420 and the "brightness" upper and lower limit range of the already set initial value. The user input is limited such that the "brightness" upper and lower limit range can be set only in the range included in the "brightness" follow-up upper and lower limit range.

The brightness follow-up setting input area 430 displays a check box 456 for switching validation/invalidation of the "brightness" follow-up process, and a numerical display box 454 indicating the average value E0 of the synthetic luminance Ei in the "brightness" follow-up upper and lower limit range to be described later. Furthermore, the brightness follow-up setting input area 430 displays a button 460 for changing or setting the follow-up region and a button 458 for automatically setting the "brightness" upper and lower limit range.

The synthetic image display area 412 and the entire synthetic image display area 414 display the synthetic image data similar to FIG. 14.

Figure 16:
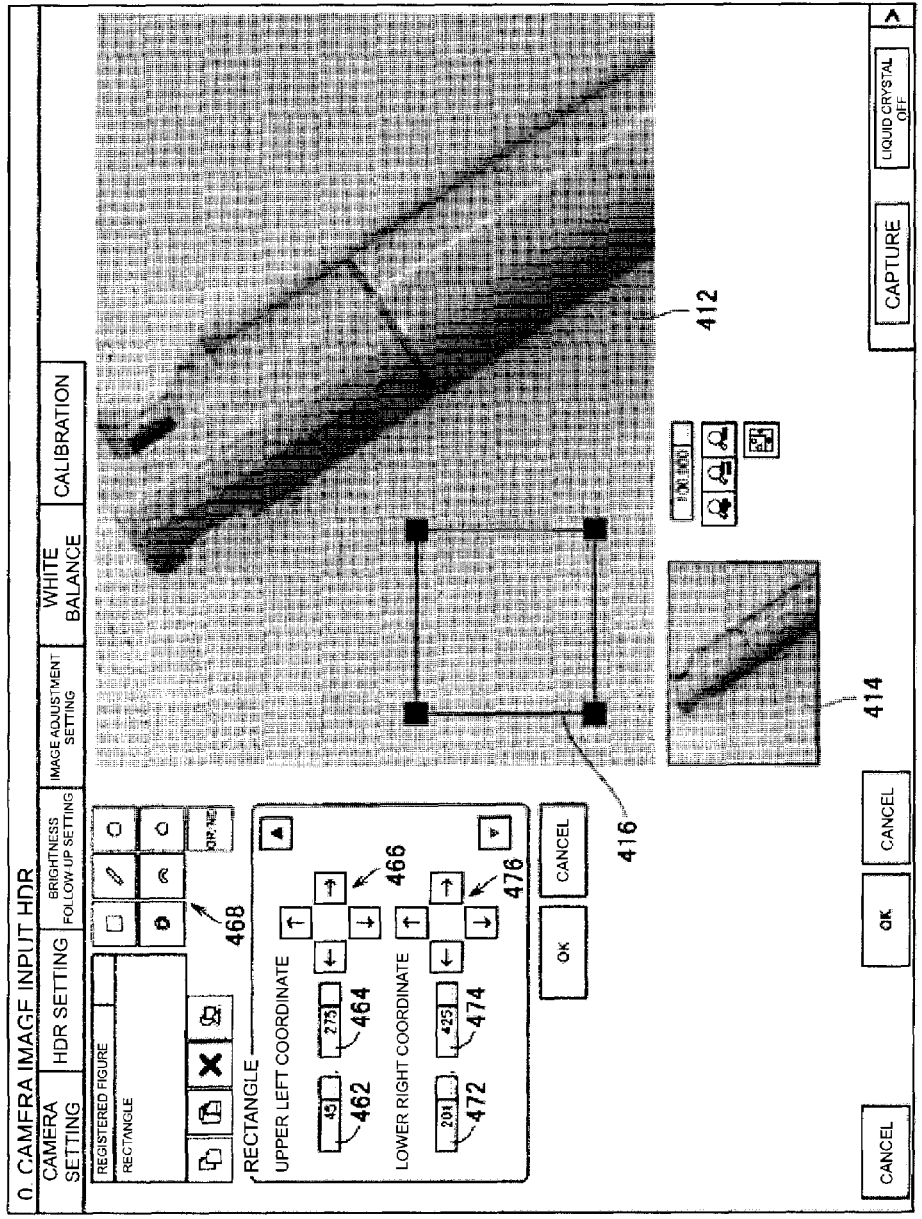
FIG. 16 is a diagram showing a screen display example (III) in the "setting mode" displayed on the monitor of the image processing device according to the embodiment of the present invention.

When the initial setting of the "brightness" follow-up upper and lower limit range is completed, the user sets the "brightness" follow-up upper and lower limit range on the setting mode screen 406 shown in FIG. 16.

When the user selects the button 460 (FIG. 15) on the setting mode screen 404 shown in FIG. 15, the setting mode screen 406 as shown in FIG. 16 is displayed. The setting mode screen 406 displays an icon group 468 for selecting the shape of the follow-up region. When the user selects any of the icon group 468, the follow-up region 416 of the selected shape is displayed overlapping the synthetic image display area 412. The shape of the follow-up region 416 may be basically only a rectangle.

The size and the position of the follow-up region 416 displayed in the synthetic image display area 412 can be changed by the mouse operation (e.g., click, drag, and the like) of the user.

Furthermore, numerical input boxes 462, 464, 472, and 474 for accepting the coordinate position (numerical value) of the follow-up region 416 and cross buttons 466 and 467 for changing the coordinate position of the follow-up region 416 are displayed in the setting mode screen 406. More specifically, the numerical input boxes 462 and 464 as well as the cross button 466 are used for the coordinate value setting of the left corner of the follow-up region 416. Similarly, the numerical input boxes 472 and 474 as well as the cross button 476 are used for the coordinate value setting of the lower right of the follow-up region 416. The display position of the follow-up region 416 is updated according to the user setting.

The user sets the follow-up region 416 to an appropriate position while referencing the synthetic image data displayed on the synthetic image display area 412. The follow-up region 416 is a region for evaluating the variation of the photographing environment with respect to the workpiece, and is preferably set to a position that is not subject to the influence involved in the operation of the production line. For instance, when the conveyance mechanism 6 maintains a constant positional relationship irrespective of the conveyance position, one part of the conveyance mechanism 6 may be set to the follow-up region 416, or when the workpiece 2 is constantly conveyed to substantially the same position of the photographing range of the imaging unit 8, one part of the workpiece 2 may be set to the follow-up region 416. Alternatively, the entire input image data photographed with the imaging unit 8 may be set to the follow-up region 416. In this case, the luminances of all the pixels contained in the input image data become the target for evaluating the variation of the photographing environment.

The setting operation on the "brightness" follow-up process according to the present embodiment is completed by the above operation.

Figure 17:
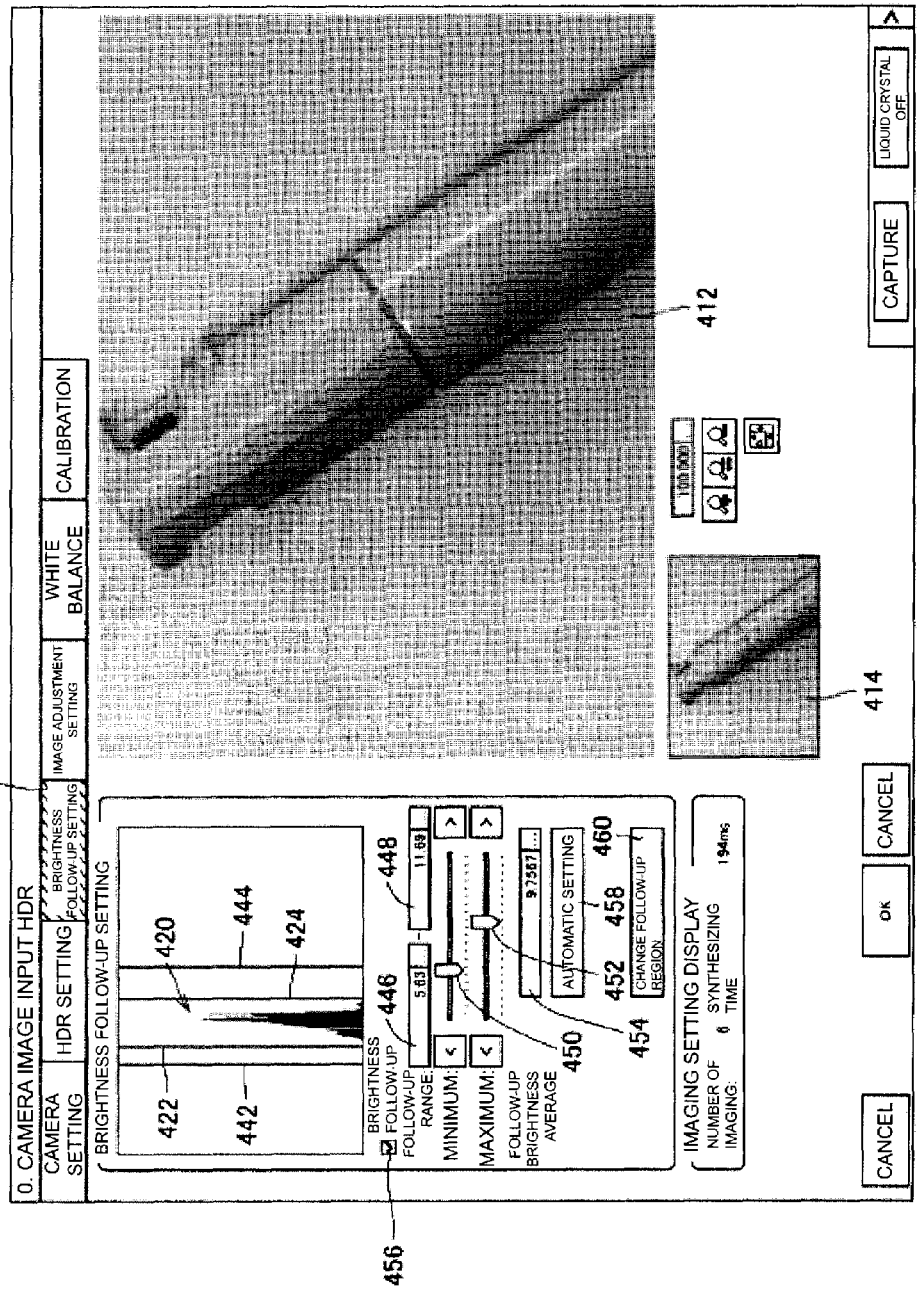
FIG. 17 is a diagram showing a screen display example (IV) in the "setting mode" displayed on the monitor of the image processing device according to the embodiment of the present invention.
Figure 18:
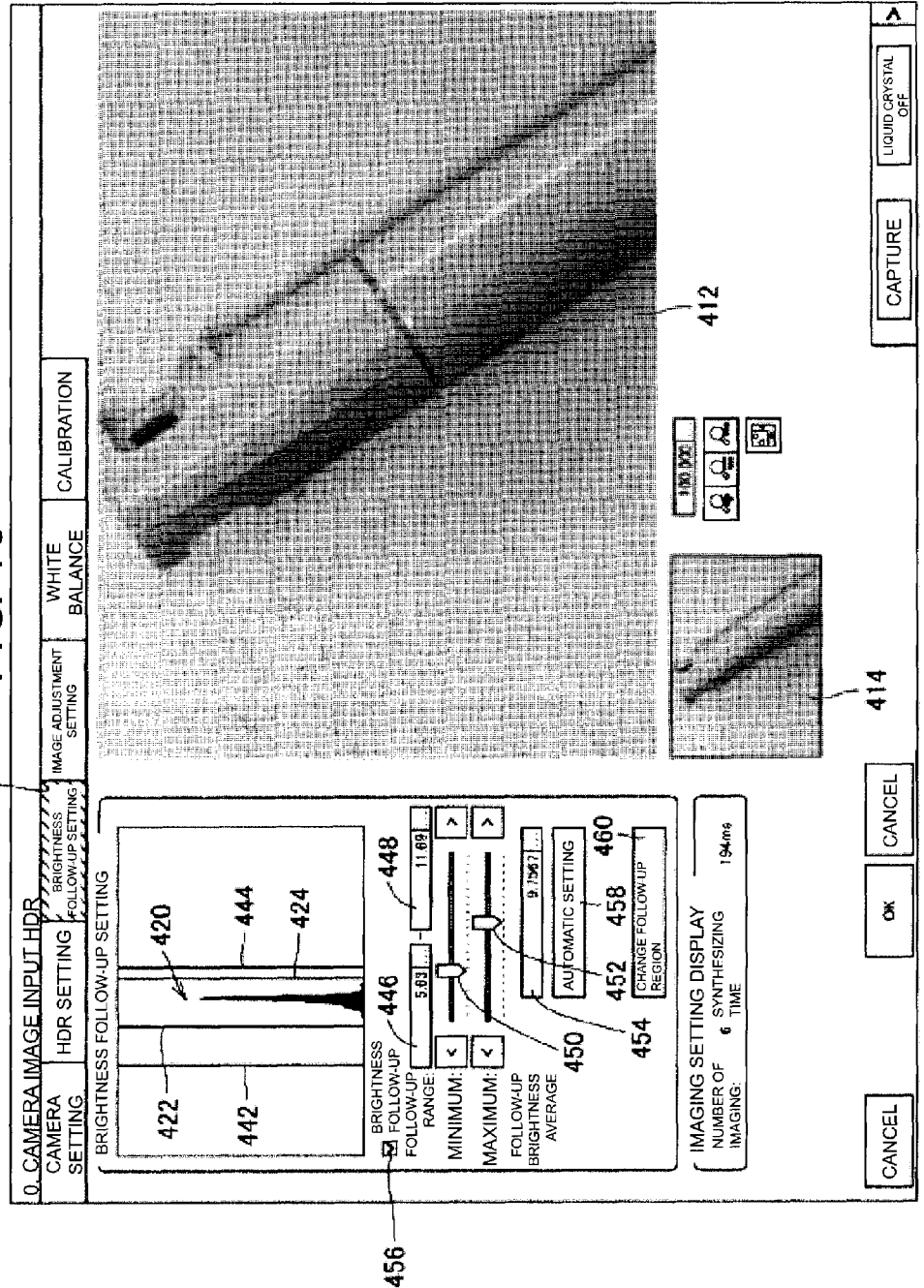
FIG. 18 is a diagram showing a screen display example (V) in the "setting mode" displayed on the monitor of the image processing device according to the embodiment of the present invention.

FIGS. 17 and 18 show screen display examples for a case in which the variation of the photographing environment occurs in a case where the image processing device according to the present embodiment is in the "setting mode".

As shown in FIG. 17, assume that the photographing environment is changed brighter after the "brightness" upper and lower limit range and the "brightness" follow-up upper and lower limit range are set. The displayed setting mode screen then changes to as shown in FIG. 18.

In the setting mode screen shown in FIG. 18, the histogram 420 on the "brightness" entirely moves to the right side ("brighter" side), and the "brightness" upper and lower limit range also shifts to the right side along therewith. As a result, it can be seen that the synthetic image data displayed in the synthetic image display area 412 maintains substantially the same image quality as the synthetic image data displayed in FIG. 17.

<Monitoring Function>

The monitoring portion 2336 shown in FIG. 12 executes monitoring functions such as (1) storing and displaying the temporal change history of the "brightness" upper and lower limit range, (2) automatically setting the "brightness" upper and lower limit range based on the temporal change history of the "brightness" upper and lower limit range, and (3) executing the error process when the "brightness" upper and lower limit range exceeds the "brightness" follow-up upper and lower limit range.

Figure 19:
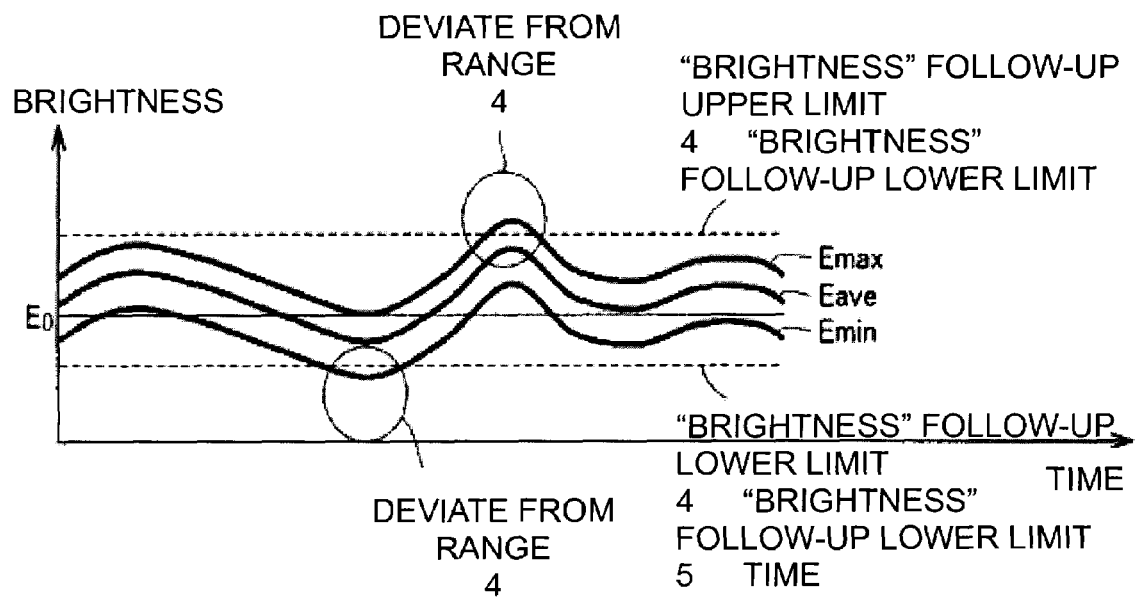
FIG. 19 is a diagram showing an example of a temporal change history of the "brightness" upper and lower limit range stored in the monitoring portion shown in FIG. 12.

FIG. 19 is a diagram showing one example of the temporal change history of the "brightness" upper and lower limit range stored in the monitoring portion 2336 shown in FIG. 12.

With reference to FIG. 19, when the average synthetic luminance Eave calculated based on the synthetic luminance Ei of the pixel contained in the follow-up region temporally fluctuates, the "brightness" upper and lower limit range also fluctuates therewith. The validity or the like of the extent of the photographing environment, the set "brightness" follow-up upper and lower limit range, and the like can be verified by storing the temporal change history of the "brightness" upper and lower limit range over a predetermined period (e.g., one day, one week, or the like). The processes such as improvement of the lighting facility of the production line and the setting change of the "brightness" follow-up upper and lower limit range can be performed based on such verification. The "brightness" follow-up process thus can be appropriately executed and the occurrence of measurement errors and the like by the change in the photographing environment can be suppressed. The temporal change history of the "brightness" upper and lower limit range as shown in FIG. 19 may be displayed on the monitor 102 according to the user operation. Furthermore, such data may be transmitted to a portable medium or an external device (not shown).

If the temporal change history of the "brightness" upper and lower limit range as shown in FIG. 19 is stored when the button 458 for automatically setting the "brightness" upper and lower limit range is selected in the setting mode screen 404 shown in FIG. 15, the maximum value and the minimum value of the "brightness" upper and lower limit range are extracted, and then the "brightness" follow-up upper and lower limit range is automatically set.

Moreover, the monitoring portion 2336 executes the error process when the "brightness" upper and lower limit range deviates from the "brightness" follow-up upper and lower limit range, that is, when the "brightness" upper limit becomes greater than the "brightness" follow-up upper limit or the "brightness" lower limit becomes smaller than the "brightness" follow-up lower limit.

A specific example of the error process in the "operation mode" includes processes such as providing NG for the test result on the workpiece at that point in time, outputting an error signal to a connected PLC and the like, and storing the input image data of that point in time.

The user can understand that the "brightness" follow-up process is not appropriately executed by executing such an error process. The user can also recognize that processes such as improvement of the lighting facility of the production line and setting change of the "brightness" follow-up upper and lower limit range are necessary.

<Processing Procedure>

Figure 20:
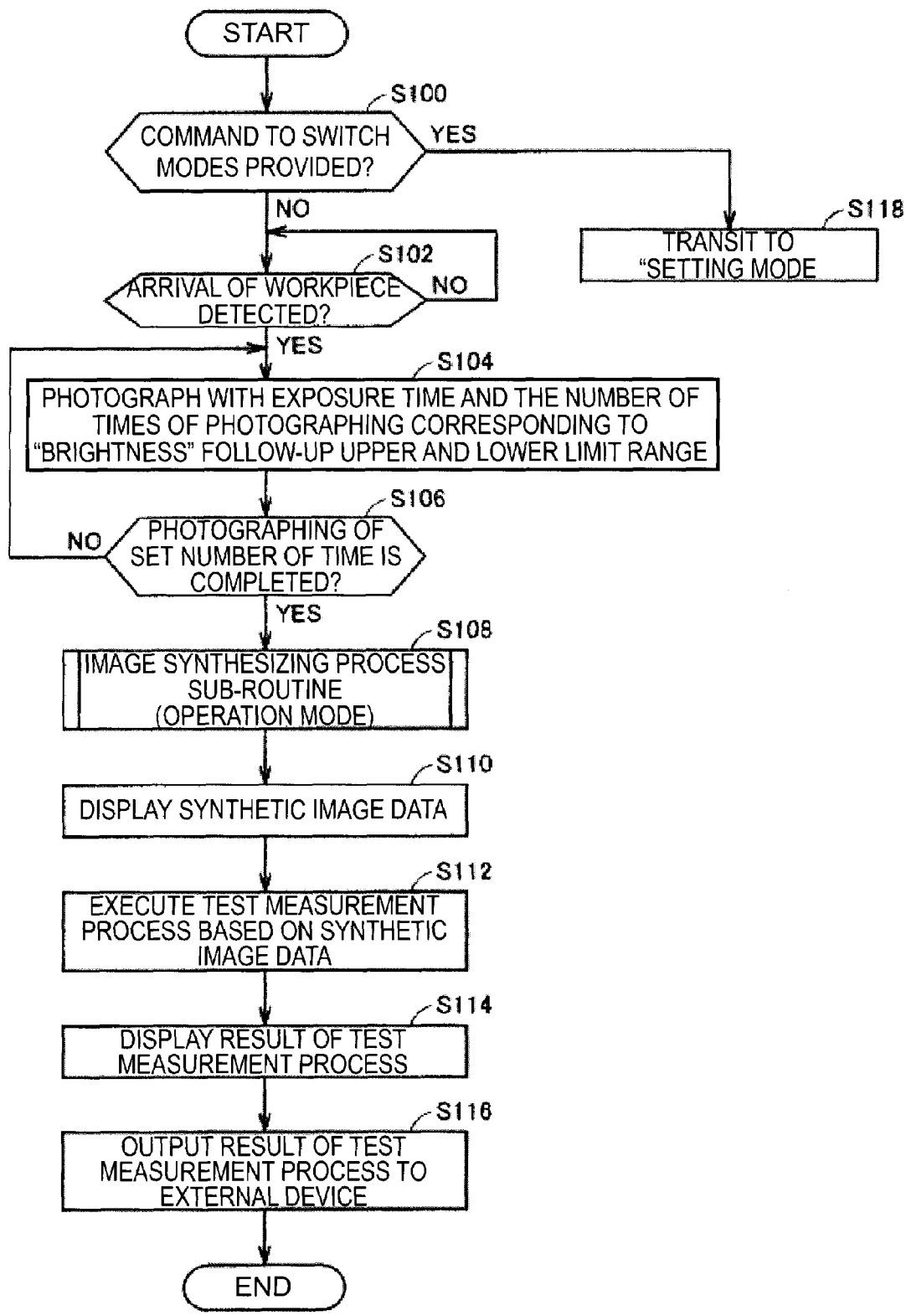
FIG. 20 is a flowchart showing an overall process in the image processing device according to the embodiment of the present invention.

FIG. 20 is a flowchart showing an overall process in the image processing device according to the embodiment of the present invention. The flowchart shown in FIG. 20 is implemented when the CPU 105 reads out the program stored in the fixed disk 107 and the like in advance to the memory 106 and executes the program. The initial mode is the "operation mode".

With reference to FIG. 20, the CPU 105 determines whether or not a command to switch modes is provided (step S100). If the command to switch modes is not provided (NO in step S100), the CPU 105 executes a test measurement process from step S102 to step S116.

In other words, the CPU 105 determines whether or not the arrival of the workpiece 2 is detected by the photoelectric sensors (step S102). If the arrival of the workpiece is not detected (NO in step S102), the process of step S102 is repeated.

If the arrival of the workpiece 2 is detected (YES in step S102), the CPU 105 photographs the workpiece 2 with a predetermined exposure time and the number of times of photographing corresponding to the "brightness" follow-up upper and lower limit range user set in the setting mode (step S104). The exposure time and the number of times of exposure are set in advance so as to cover the "brightness" of the "brightness" follow-up upper and lower limit range. The CPU 105 then determines whether or not the photographing of the set number of times is completed (step S106). If the photographing of the set number of times is not completed (NO in step S106), the CPU 105 repeats the process of step S104.

If the photographing of the set number of times is completed (YES in step S106), the CPU 105 executes an image synthesizing process sub-routine (operation mode) (step S108). The synthetic image data is generated from the photographed input image data by the execution of the image synthesizing process sub-routine (operation mode). The CPU 105 then displays the generated synthetic image data on the monitor 102 and the like (step S110).

Thereafter, the CPU 105 executes the test measurement process based on the generated synthetic image data (step S112). Examples of the test measurement process include a search process for searching a portion that matches the image pattern registered in advance and an edge scan process for detecting the edge of the workpiece and measuring the distance between the edges.

Finally, the CPU 105 displays the result of the test measurement process on the monitor 102 and the like (step S114), and outputs the result to the external device such as the PLC (step S116). The series of processes is thereby terminated. The series of processes after step S100 is repeatedly executed with a predetermined period.

Figure 23:
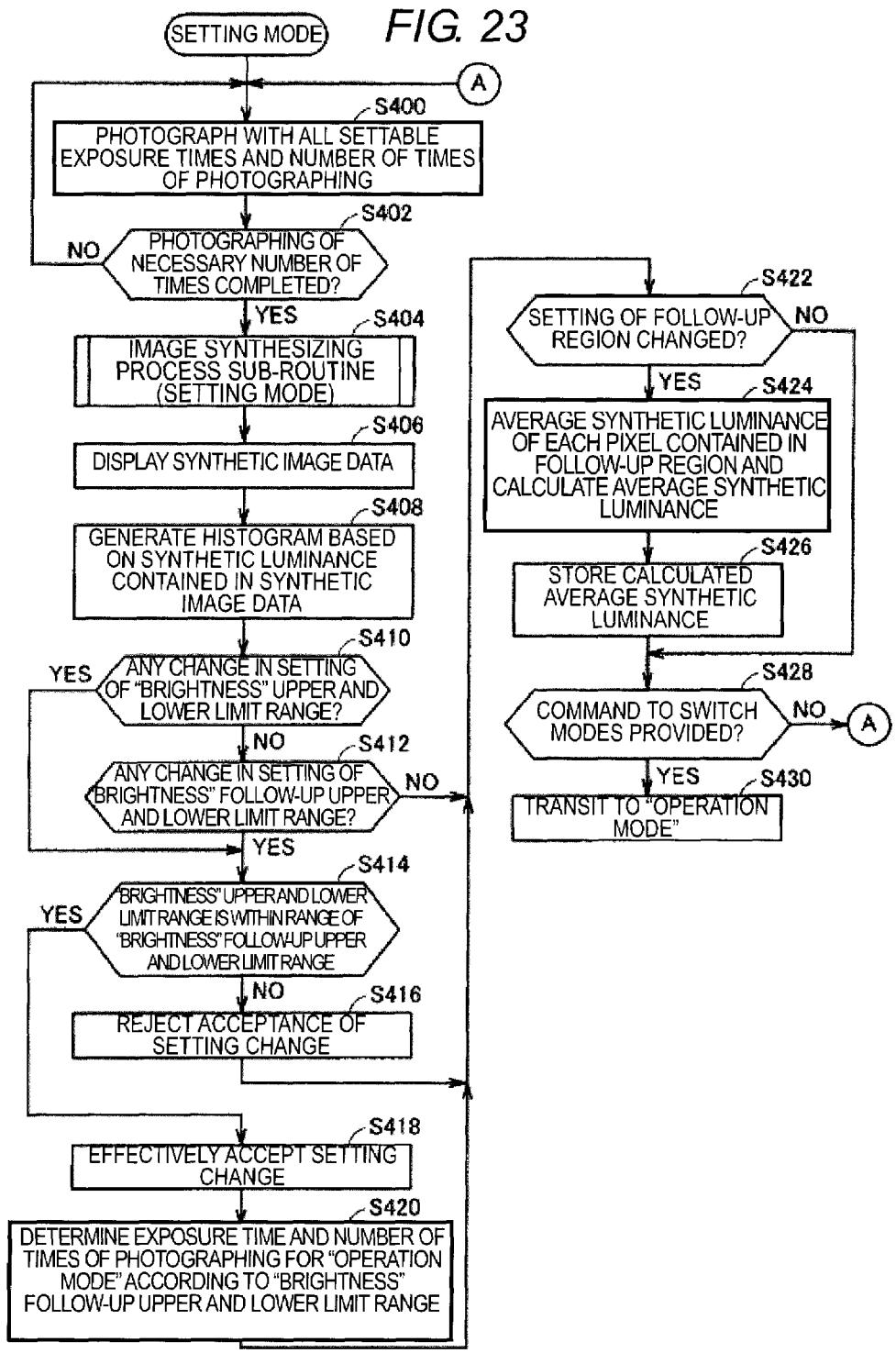
FIG. 23 is a flowchart showing a process in the "setting mode" in the image processing device according to the embodiment of the present invention.

When the command to switch modes is provided (YES in step S100), the CPU 105 transits to the "setting mode" (step S118). The process shown in FIG. 23 is then executed.

(Image Synthesizing Process Sub-Routine (Operation Mode))

Figure 21:
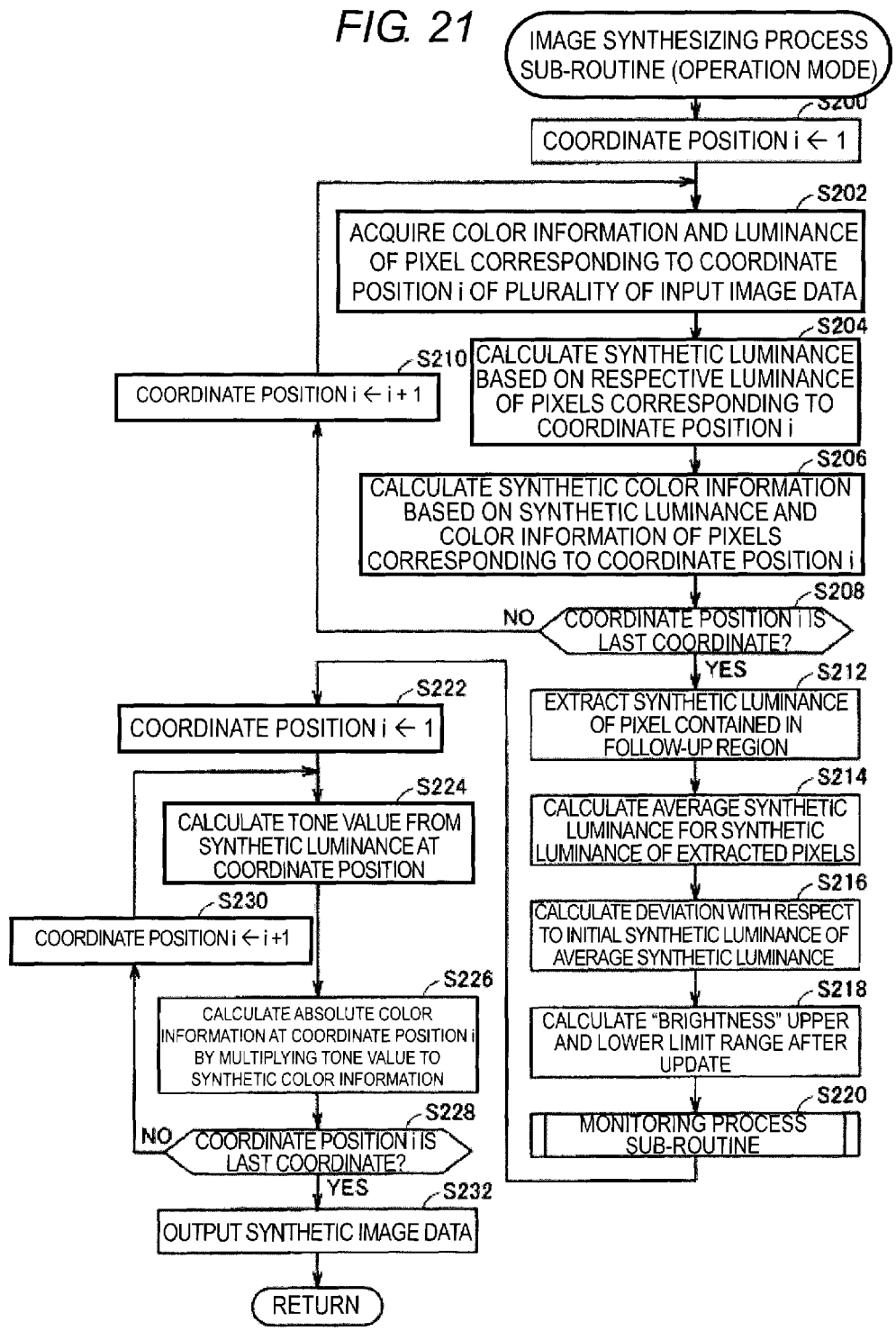
FIG. 21 is a flowchart showing a process in the image synthesizing process sub-routine (operation mode) shown in FIG. 20.

FIG. 21 is a flowchart showing a process in the image synthesizing process sub-routine (operation mode) shown in FIG. 20. The flowchart shown in FIG. 21 is implemented when the CPU 105 reads out the program stored in the fixed disk 107 or the like in advance to the memory 106 and executes the program.

With reference to FIG. 21, the CPU 105 sets the coordinate position i to an initial value (i=1) (step S200), and acquires the color information and the luminance of each pixel corresponding to the coordinate position i of a plurality of photographed input image data (step S202).

Thereafter, the CPU 105 calculates the synthetic luminance Ei at the coordinate position i based on each of the luminances of the pixels corresponding to the coordinate position i of a plurality of input image data (step S204). Similarly, the CPU 105 calculates the synthetic color information (ri, gi, bi) at the coordinate position i based on the synthetic luminance and the color information of the pixels corresponding to the coordinate position i of a plurality of input image data (step S206).

The CPU 105 then determines whether or not the coordinate position i is the last coordinate contained in the input image data (step S208). If the coordinate position i is not the last coordinate contained in the input image data (NO in step S208), the CPU 105 adds "1" to the current coordinate position i (step S210), and repeats the processes after step S202.

If the coordinate position i is the last coordinate contained in the input image data (YES in step S208), the CPU 105 extracts the synthetic luminance Ei of the pixel contained in the follow-up region (step S212), and calculates the average synthetic luminance Eave for the synthetic luminance Ei of the extracted pixel (step S214).

Thereafter, the CPU 105 calculates the deviation $\Delta E$ with respect to the initial synthetic luminance E0 acquired in advance in the setting mode of the average synthetic luminance Eave (step S216). Furthermore, the CPU 105 calculates the "brightness" upper and lower limit range after the update (step S218). Specifically, the CPU 105 executes the following calculations with the "brightness" upper limit Emax and the lower limit Emin after the update.

$$Emax = Emax0 + \Delta E$$

$$Emin = Emin0 + \Delta E$$

The CPU 105 then executes the monitoring process sub-routine (step S220).

After the execution of the monitoring process sub-routine, the CPU 105 sets the coordinate position i to an initial value (i=1) (step S222), and calculates the tone value Yi from the synthetic luminance Ei of the coordinate position i based on the "brightness" upper limit Emax and the lower limit Emin after the update (step S224). Furthermore, the CPU 105 calculates the absolute color information (Ri, Gi, Bi) at the coordinate of the coordinate position i of the synthetic image data by multiplying the calculated tone value Yi on the synthetic color information (ri, gi, bi) at the coordinate position i (step S226).

The CPU 105 then determines whether or not the coordinate position i is the last coordinate contained in the input image data (step S228). If the coordinate position i is not the last coordinate contained in the input image data (NO in step S228), the CPU 105 adds "1" to the current coordinate position i (step S230), and repeats the processes after step S224.

If the coordinate position i is the last coordinate contained in the input image data (YES in step S228), the CPU 105 outputs the synthetic image data including the absolute color information (Ri, Gi, Bi) at each coordinate position (step S232). The process then returns.

(Monitoring Process Sub-Routine)

Figure 22:
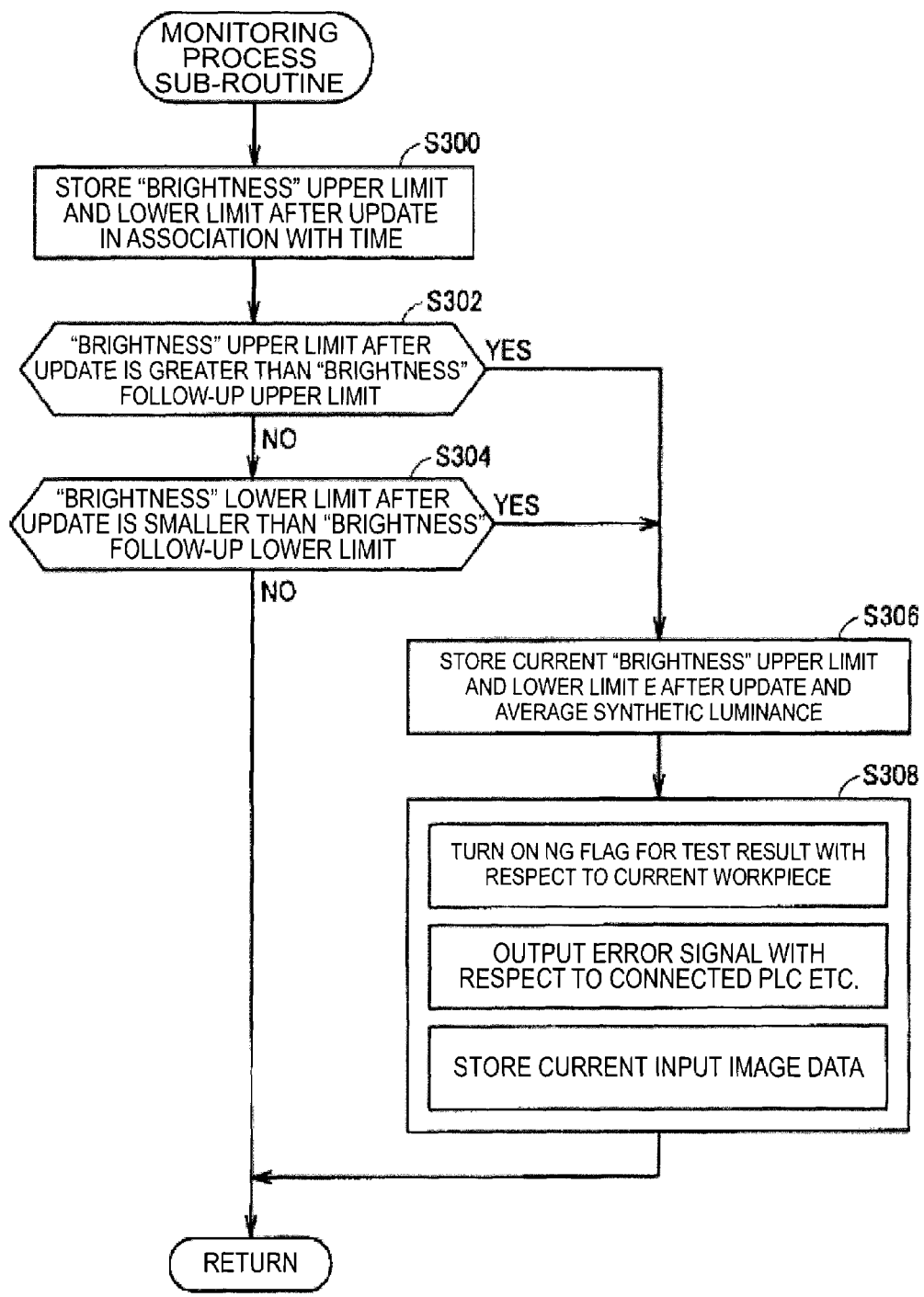
FIG. 22 is a flowchart showing the process in the monitoring process sub-routine shown in FIG. 21.

FIG. 22 is a flowchart showing the process in the monitoring process sub-routine shown in FIG. 21. The flowchart shown in FIG. 22 is implemented when the CPU 105 reads out the program stored in advance in the fixed disk 107 and the like to the memory 106, and executes the program.

With reference to FIG. 22, the CPU 105 stores the "brightness" upper limit Emax and the lower limit Emin after the update calculated in step S218 of FIG. 21 in association with time (or hour) (step S300).

Thereafter, the CPU 105 determines whether or not the "brightness" upper limit Emax after the update is greater than the "brightness" follow-up upper limit (step S302). If the "brightness" upper limit Emax after the update is not greater than the "brightness" follow-up upper limit (NO in step S302), the CPU 105 determines whether or not the "brightness" lower limit Emin after the update is smaller than the "brightness" follow-up lower limit (step S304).

If the "brightness" upper limit Emax after the update is greater than the "brightness" follow-up upper limit (YES in step S302), or if the "brightness" lower limit Emin after the update is smaller than the "brightness" follow-up lower limit (YES in step S304), the CPU 105 stores the current "brightness" upper limit Emax and the lower limit Emin after the update as well as the average synthetic luminance Eave.

Thereafter, the CPU 105 executes the error process (step S308). The error process of step S308 includes (1) turning ON an NG flag for the test result with respect to the current workpiece, (2) outputting an error signal with respect to the connected PLC and the like, and (3) storing the current input image data. The process then returns.

If the "brightness" upper limit Emax after the update is not greater than the "brightness" follow-up upper limit (NO in step S302), the process returns without executing other processes.

(Setting Mode)

FIG. 23 is a flowchart showing a process in the "setting mode" in the image processing device according to the embodiment of the present invention. The flowchart shown in FIG. 23 is implemented when the CPU 105 reads out the program stored in advance in the fixed disk 107 and the like to the memory 106, and executes the program.

With reference to FIG. 23, the CPU 105 causes the imaging unit 8 to photograph the workpiece 2 with all the exposure times and the number of times of photographing that can be set to the imaging unit 8 (step S400). The CPU 105 then determines whether or not the photographing of the necessary number of times is completed (step S402). If the photographing of the necessary number of times is not completed (NO in step S402), the CPU 105 repeats the process of step S402.

If the photographing of the necessary number of times is completed (YES in step S402), the CPU 105 executes the image synthesizing process sub-routine (setting mode) (step S404). The synthetic image data is generated from the photographed input image data by the execution of the image synthesizing process sub-routine (operation mode). The CPU 105 then displays the generated synthetic image data on the monitor 102 and the like (step S406).

The CPU 105 then generates a histogram based on the synthetic luminance Ei contained in the generated synthetic image data (step S408).

The CPU 105 then determines whether or not the setting of the "brightness" upper and lower limit range is changed by the user (step S410). If the setting of the "brightness" upper and lower limit range is not changed (NO in step S410), the CPU 105 determines whether or not the setting of the "brightness" follow-up upper and lower limit range is changed (step S412).

If the setting of the "brightness" upper and lower limit range is changed (YES in step S410), or if the setting of the "brightness" follow-up upper and lower limit range is changed (YES in step S412), the CPU 105 determines whether or not the "brightness" upper and lower limit range is within the range of the "brightness" follow-up upper and lower limit range after the change (step S414). If the "brightness" upper and lower limit range is within the range of the "brightness" follow-up upper and lower limit range after the change (NO in step S414), the acceptance of the setting change is rejected (step S416).

If the "brightness" upper and lower limit range is within the "brightness" follow-up upper and lower limit range after the change (YES in step S414), the setting change is effectively accepted (step S418). Furthermore, the CPU 105 determines the exposure time and the number of times of photographing (for the "operation mode") by the imaging unit 8 so as to cover the "brightness" range of the "brightness" follow-up upper and lower limit range (step S420).

If the setting of the "brightness" follow-up upper and lower limit range is not changed (NO in step S412), or after the execution of step S416 or S420, the CPU 105 determines whether or not the setting of the follow-up region is changed by the user (step S422). If the setting of the follow-up region is changed (YES in step S422), the CPU 105 averages the synthetic luminance Ei of each pixel contained in the follow-up region, and calculates the average synthetic luminance Eave (step S424). The CPU 105 then stores the calculated average synthetic luminance Eave (step S426).

The CPU 105 then determines whether or not a command to switch modes is provided (step S428). If the command to switch modes is not provided (NO in step S428), the CPU 105 repeatedly executes the processes after step S400.

If the command to switch modes is provided (YES in step S428), the CPU 105 transits to the "operation mode" (step S430). The process shown in FIG. 20 is then executed.

(Image Synthesizing Process Sub-Routine (Setting Mode))

Figure 24:
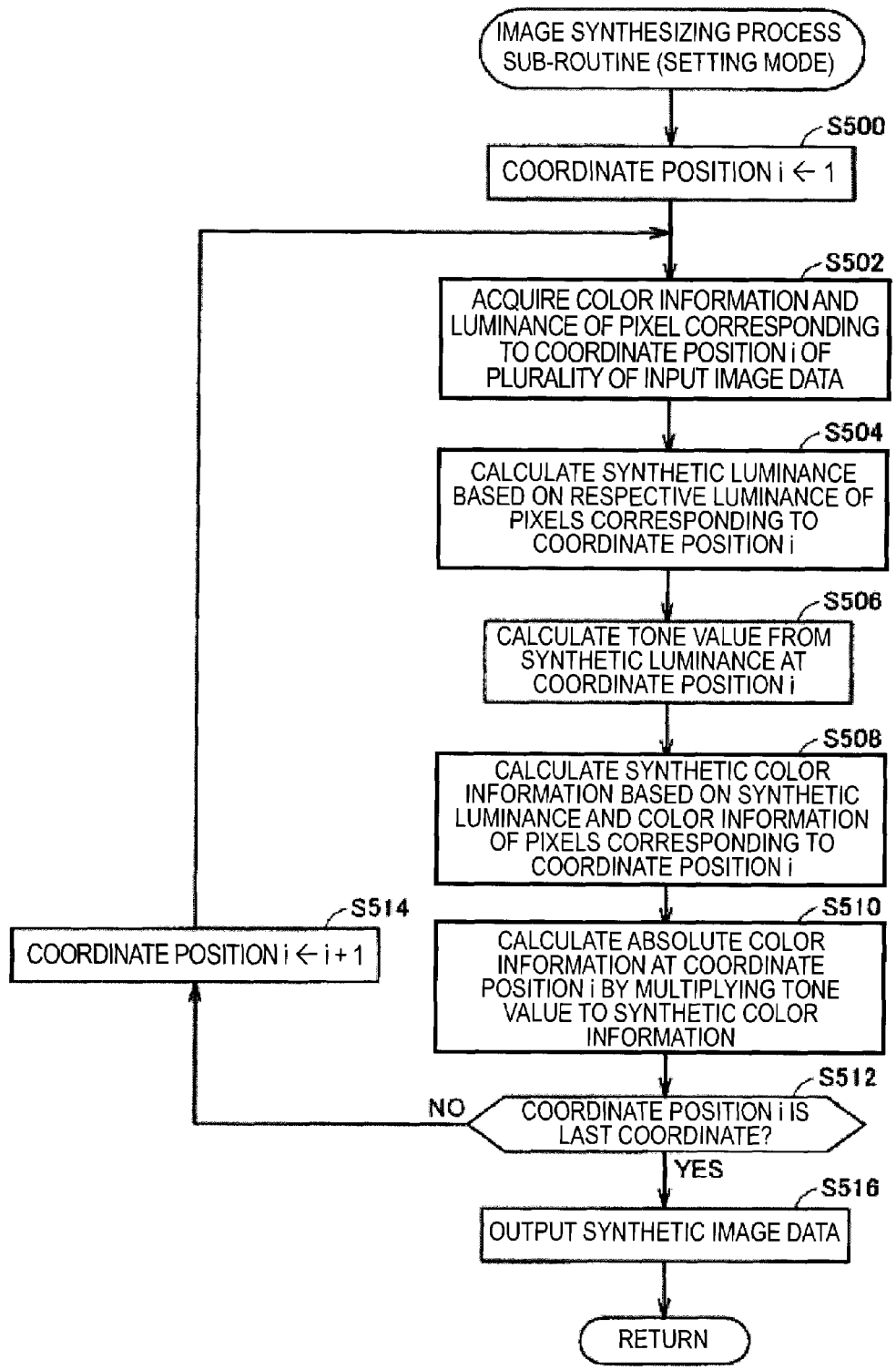
FIG. 24 is a flowchart showing a process in the image synthesizing process sub-routine (setting mode) shown in FIG. 23.

FIG. 24 is a flowchart showing the processing in the image synthesizing process sub-routine (setting mode). The flowchart shown in FIG. 24 is implemented by the CPU 105 reading out the program stored in advance in the fixed disk 107 and the like to the memory 106 and executing the program.

With reference to FIG. 24, the CPU 105 sets the coordinate position i to the initial value (i=1) (step S500), and acquires the color information and the luminance of each pixel corresponding to the coordinate position i of a plurality of input image data (step S502).

The CPU 105 then calculates the synthetic luminance Ei at the coordinate position i based on each of the luminances of the pixels corresponding to the coordinate position i of a plurality of input image data (step S504), and also calculates the tone value Yi from the synthetic luminance Ei based on the initial values Emax0 and Emin0 of the user set "brightness" upper and lower limit range (step S506).

Similarly, the CPU 105 calculates the synthetic color information (ri, gi, bi) of the coordinate position i based on the luminance and the color information of each pixel corresponding to the coordinate position i of a plurality of input image data (step S508).

The CPU 105 also calculates the absolute color information (Ri, Gi, Bi) at the coordinate of the coordinate position i of the synthetic image data by multiplying the calculated tone value Yi to the synthetic color information (ri, gi, bi) of the coordinate position i (step S510).

The CPU 105 then determines whether or not the coordinate position i is the last coordinate contained in the input image data (step S512). If the coordinate position i is not the last coordinate contained in the input image data (NO in step S512), the CPU 105 adds "1" to the current coordinate position i (step S514), and returns the process subsequent to step S502.

If the coordinate position i is the last coordinate contained in the input image data (YES in step S512), the CPU 105 outputs the synthetic image data including the absolute color information (Ri, Gi, Bi) at each coordinate position (step S516). The process then returns.

Effects of the Present Embodiment

According to the embodiment of the present invention, the measuring article (workpiece) is photographed with the exposure time and the number of times of photographing corresponding to the "brightness" follow-up upper and lower limit range wider than the user set "brightness" upper and lower limit range. Thus, the measuring article is photographed in the dynamic range corresponding to the "brightness" follow-up upper and lower limit range. As the luminance in the "brightness" upper and lower limit range is converted to the effective tone value of such photographed data, the data is generated as the synthetic image data.

Even if the photographing environment (in particular, lighting environment) varies, the measuring article can be effectively photographed if such variation is within the "brightness" follow-up upper and lower limit range. The correspondence relationship as to which luminance range be converted to the effective tone value is sequentially updated according to the photographing environment, so that the influence of the photographing environment can excluded in the ultimately generated synthetic image data.

Therefore, the synthetic image data including the effective image information can be generated without being subjected to the influence of the variation of the photographing environment.

According to the embodiment of the present invention, the temporal change history of the "brightness" upper and lower limit range is monitored. Thus, the user can verify validity and the like of the extent of the photographing environment and the set "brightness" follow-up upper and lower limit range by referencing the temporal change history of the "brightness" upper and lower limit range. Furthermore, the processes such as improvement of the lighting facility of the production line and the change in setting of the "brightness" follow-up upper and lower limit range can be performed based on such verification.

The "brightness" follow-up process thus can be appropriately executed and the occurrence of measurement error and the like by the change in the photographing environment can be suppressed.

The error process is executed when the "brightness" upper and lower limit range deviates from the "brightness" follow-up upper and lower limit range. The user can understand that the "brightness" follow-up process is not appropriately executed by executing such error process. The user can also recognize that processes such as improvement of the lighting facility of the production line and change in setting of the "brightness" follow-up upper and lower limit range are necessary.

First Variation of the Embodiment

In the image processing device according to the above-described embodiment, there has been illustrated a configuration of changing the range of the synthetic luminance Ei to be converted to an effective tone value by updating the "brightness" upper and lower limit range according to the fluctuation of the "brightness" by the variation of the photographing environment. In the first variation, a configuration of obtaining similar effects by correcting the calculated synthetic luminance Ei itself will be illustrated.

The overall control configuration of an image processing device according to the first variation is similar to FIG. 5 other than the control structure of the follow-up unit, and thus the detailed description will not be repeated.

Figure 25:
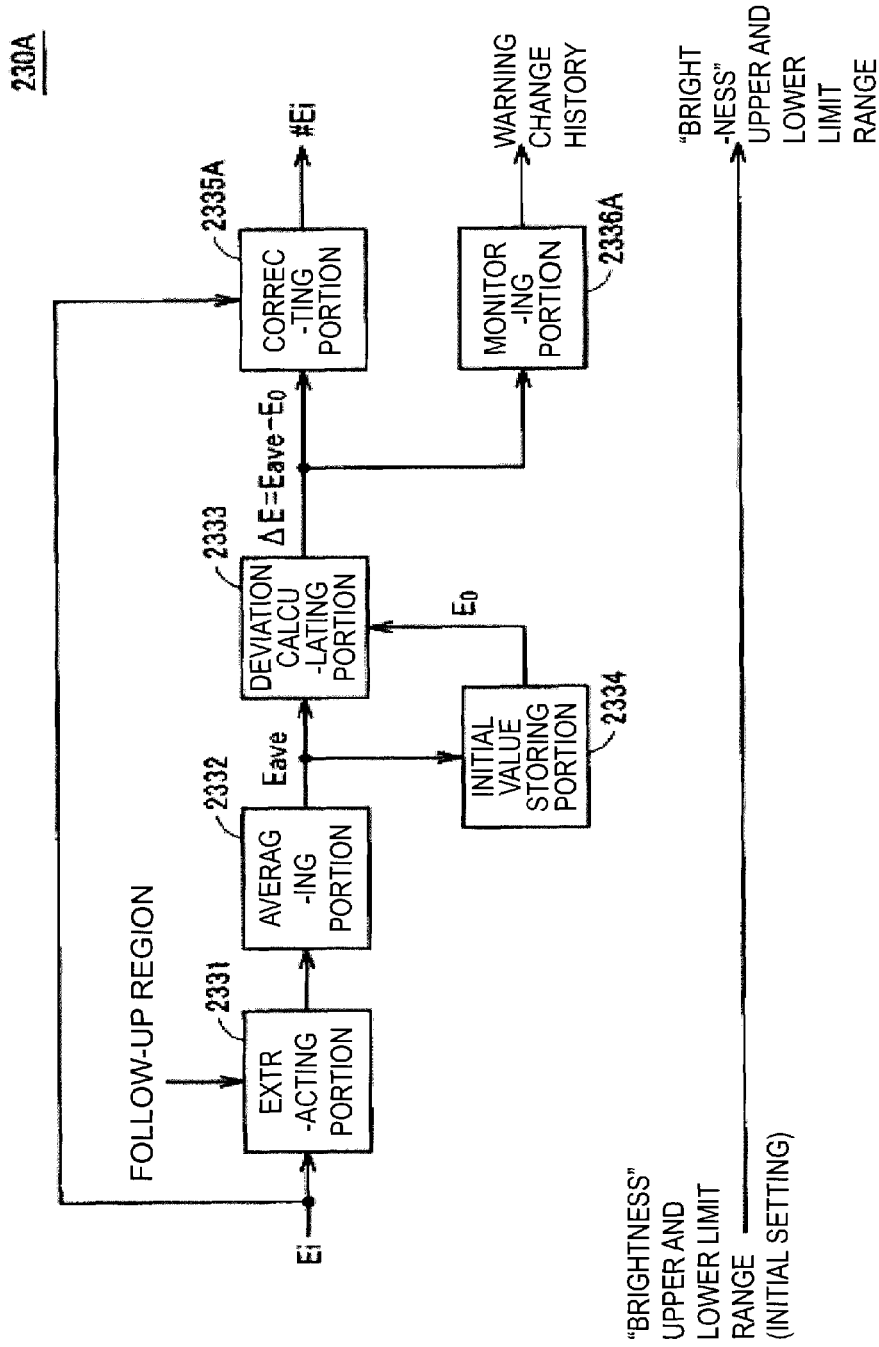
FIG. 25 is a function block diagram showing a more detailed control structure of the follow-up unit according to a first variation of the embodiment of the present invention.

FIG. 25 is a function block diagram showing a detailed control structure of a follow-up unit 230A according to the first variation of the embodiment of the present invention.

With reference to FIG. 25, the follow-up unit 230A according to the first variation includes the extracting portion 2331, the averaging portion 2332, the deviation calculating portion 2333, the initial value storing portion 2334, a correcting portion 2335A, and a monitoring portion 2336A. The extracting portion 2331, the averaging portion 2332, the deviation calculating portion 2333, and the initial value storing portion 2334 are similar to those of the follow-up unit 230 shown in FIG. 12, and thus the detailed description will not be repeated.

The correcting portion 2335A of the follow-up unit 230A according to the first variation corrects (shifts) the synthetic luminance Ei of each pixel calculated in the luminance synthesizing unit 210 (FIG. 5) based on the deviation ΔE with respect to the initial synthetic luminance E0 of the average synthetic luminance Eave. In other words, the correcting portion 2335A subtracts the deviation ΔE corresponding to the amount of shift from the synthetic luminance Ei to return the shift of the distribution of the synthetic luminance Ei as shown in FIG. 10 to the original position. More specifically, the correcting portion 2335A calculates the synthetic luminance (after correction) #Ei according to the following mathematical equation.

synthetic luminance (after correction) #*Ei*=synthetic luminance *Ei*−deviation Δ*E*

The tone mapping unit 214 (FIG. 5) calculates the corresponding tone value Yi with respect to the synthetic luminance (after correction). In this case, the "brightness" upper and lower limit range used in the tone mapping unit 214 (FIG. 5) is maintained as the initially set "brightness" upper and lower limit range.

The monitoring portion 2336A provides presence of abnormality of the "brightness" follow-up process, the user guidance, and the like based on the magnitude of the deviation ΔE. The content of the specific process is similar to the monitoring portion 2336 described above, and thus the detailed description will not be repeated.

Other control structures, processing procedures, and the like are similar to the embodiment described above, and thus the detailed description thereof will not be repeated.

Second Variation of the Embodiment

In the image processing device according to the above-described embodiment, an example of calculating the synthetic luminance Ei of each pixel based on the logarithm of the value ($=g(Z_{i,j})/\Delta t_j$) obtained by standardizing the luminance of each pixel as shown in equation (1) has been described. In place of such a calculation method, a weighted average with weight (addition calculation) for the value obtained by standardizing the luminance of each pixel may be calculated, and then the logarithm may be taken to calculate the synthetic luminance Ei of each pixel. A case of using such a calculation method will be described below.

Specifically, the calculation formula of the synthetic luminance Ei of each pixel according to the second variation is as expressed with equation (3).

$$\ln E_i = \ln \left( \frac{\sum_{j=1}^{P} w(Z_{i,j}) \cdot \frac{g(Z_{i,j})}{\Delta t_j} \cdot C}{\sum_{j=1}^{P} w(Z_{i,j})} \right) \quad (3)$$

Where,
w(Z): weighting function,
g(Z): response function of imaging element
$Z_{i,j}$: luminance information at coordinate position i of $j^{th}$ input image datum
$\Delta t_j$: exposure time of $j^{th}$ input image datum In equation (3), the term "$(g(Z_{i,j})/\Delta t_j)$" is equivalent to the value obtained by standardizing the luminance of each pixel in each of the input image data with the exposure time and evaluating as the "brightness". The logarithm is calculated after calculating (addition process) the weighted average with weight with respect to the standardized value.

Third Variation of the Embodiment

In the image processing device according to the above-described embodiment, an example of calculating the synthetic luminance Ei of each pixel based on the logarithm of the value ($=g(Z_{i,j})/\Delta t_j$) obtained by standardizing the luminance each pixel has been described as shown in equation (1). In place of such a calculation method, a weighted average with weight (addition calculation) for the value obtained by standardizing the luminance of each pixel may be calculated, and then the gamma correction (y power) may be performed to calculate the synthetic luminance Ei of each pixel. A case of using such a calculation method will be illustrated below.

Specifically, the calculation formula of synthetic luminance Oi of after the gamma correction of each pixel according to the third variation is as expressed with equation (4.1), where the calculation formula of the synthetic luminance Ei is as expressed with equation (4.2).

$$O_i = a \cdot E_i^\gamma + b \quad (4.1)$$

$$E_i = \frac{\sum_{j=1}^{P} w(Z_{i,j}) \cdot \frac{g(Z_{i,j})}{\Delta t_j} \cdot C}{\sum_{j=1}^{P} w(Z_{i,j})} \quad (4.2)$$

Where,
w(Z): weighting function,
g(Z): response function of imaging element
$Z_{i,j}$: luminance information at coordinate position i of $j^{th}$ input image datum
$\Delta t_j$: exposure time of $j^{th}$ input image datum In equation (4.1), y is a variable for adjusting the gamma correction amount, and a and b are constants that can be set to any value. The gamma correction shows an intermediate correction characteristic of the logarithmic conversion and the linear conversion as shown in the second variation, which correction amount is determined by the magnitude of the y. In other words, if y=1, linear conversion (weighted average with weight) is shown, and if y→0, the correction characteristic approximate to the logarithmic conversion is shown. If 0<y<1, an intermediate correction characteristic of the linear conversion and the logarithmic conversion is shown.

In equation (4.2), the term "$(g(Z_{i,j})/\Delta t_j)$" is equivalent to the value obtained by standardizing the luminance of each pixel in each of the input image data with the exposure time and evaluating as the "brightness". The weighted average with weight is calculated with respect to the standardized value.

Other Embodiments

The program according to the present invention may include calling a necessary module, of the program modules provided as part of the operating system (OS) of the computer, with a predetermined array and at a predetermined timing and executing the process. In such a case, the module is not contained in the program itself, and the process is executed in cooperation with the OS. The program not including the module is also encompassed in the program of the present invention.

The program according to the present invention may be provided by being incorporated in one part of other programs. In such a case as well, the program itself does not include the module contained in other programs, and the process is executed in cooperation with other programs. The program incorporated in such other programs is also encompassed in the program of the present invention.

The program product to be provided is executed by being installed in a program storage unit such as a hard disk. The program product includes the program itself and the recording medium on which the program is stored.

Some or all of the functions implemented by the program of the present invention may be configured by dedicated hardware.

The embodiments disclosed herein are illustrative in all aspects and should not be construed as being restrictive. The scope of the invention is defined by the claims rather than by the above description, and all modifications equivalent in meaning to the claims and within the scope thereof are intended to be encompassed therein.

What is claimed is:

1. An image processing device connected to an imaging unit and a display unit, the imaging unit including an imaging element partitioned into a plurality of pixels and having an exposure condition changeable, the image processing unit comprising:
    an acquiring unit for acquiring a plurality of image data for synthesizing an image expressed by a tone range larger than the display capability of the display unit by causing the imaging unit to photograph a photographing range plurality of times under different exposure conditions;
    a calculation unit for calculating a luminance distribution corresponding to a distribution of a light energy entering the imaging element based on the plurality of image data and the exposure condition corresponding to each of the image data;
    a conversion unit for converting the luminance distribution to a distribution of a tone value in a default numerical range to be displayed on the display unit, the conversion unit configured to perform the conversion by relating a luminance value within a first luminance range which is set to a luminance range to be expressed in the luminance distribution to be corresponded to the tone value in the tone range of the display unit;

a setting unit for accepting a second luminance range in which the update of the first luminance range is allowed in the luminance distribution; and an updating unit for updating a position of the first luminance range in the second luminance range in accordance with a change of the photographing environment and determining the change of the imaging environment based on the light energy entering the imaging element.

2. The image processing device according to claim 1, further comprising:

a displaying unit for causing the display unit to display the luminance distribution wherein the updating unit is configured to simultaneously display the set second luminance range with the luminance distribution.

3. The image processing device according to claim 1, wherein the updating unit further includes:

a unit for accepting a region setting with respect to the image data imaged by the imaging unit, and a unit for shifting a position of the first luminance range while maintaining a width of the first luminance range based on the luminance of a pixel for which the region setting has been performed.

4. The image processing device according to claim 3, wherein the updating unit further comprises a unit for executing an error process when part of the first luminance range is updated outside the second luminance range.

5. The image processing device according to claim 3, wherein the updating unit further comprises a unit for displaying a temporal change history of the first luminance range on the display unit.

6. The image processing device according to claim 5, wherein the updating unit further comprises a unit for setting the second luminance range based on the temporal change history of the first luminance range.

7. The image processing device according to claim 1, wherein the updating unit further comprises a unit for accepting an initial value of the first luminance range, a settable range of the initial value of the first luminance range being limited to within the second luminance range.

8. The image processing device according to claim 1, further comprising:

a generation unit for generating data of a synthetic image based on color information contained in the plurality of image data and the tone value of the corresponding pixels.

9. The image processing device according to claim 1, wherein the calculation unit is configured to calculate a luminance value distribution corresponding to the distribution of the light energy entering the imaging element by calculating the luminance value corresponding to the light energy entering the imaging element being obtained based on the plurality of image data and the exposure condition corresponding to each of the image data, the luminance value having a same or greater resolution than a predetermined value within an effective dynamic range, wherein the first luminance range is a range smaller than the effective dynamic range, wherein the updating unit is configured to update the first luminance range corresponded to the tone value in the conversion unit to an updated range as an updated first luminance range that is included in the effective dynamic range in addition to being smaller than the effective dynamic range and that is different from the first luminance range, according to variation in the light energy entering the imaging element.

10. The image processing device according to claim 9, further comprising:

a display unit for displaying the default range tone value distribution.

11. The image processing device according to claim 9, further comprising:

a unit for accepting a region setting with respect to the image data imaged by the imaging unit, wherein the updating unit is configured to update the first luminance range to the updated first luminance range such that a tone value distribution in the region setting obtained through conversion by the conversion unit after the update is substantially the same as the tone value distribution before the update.

12. The image processing device according to claim 11, wherein the updating unit is configured to perform an update to the updated first luminance range having a width of a dynamic range equal to a width of the dynamic range of the first luminance range.

13. The image processing device according to claim 9, wherein the updating unit comprises a unit for accepting the second luminance range.

14. The image processing device according to claim 13, further comprising:

a display unit for simultaneously displaying the luminance value of the second luminance range with the luminance value of the effective dynamic range.

15. The image processing device according to claim 9, wherein the updating unit further comprises:

a unit for executing an error process when part of the updated first luminance range is updated outside the effective dynamic range.

16. The image processing device according to claim 9, wherein the updating unit further comprises a unit for accepting an initial value of the first luminance range, wherein a settable range of the initial value of the first luminance range is limited to within the effective dynamic range.

17. An image processing method in a device connected to an imaging unit and a display unit, the imaging unit including an imaging element partitioned into a plurality of pixels, the method comprising the steps of:

accepting a first luminance range; which is a luminance range to be expressed in the display unit;

accepting a second luminance range in which the first luminance range is contained;

acquiring a plurality of image data for synthesizing an image expressed by a tone range larger than the display capability of the display unit by causing the imaging unit to photograph a photographing range plurality of times under different exposure conditions;

calculating a luminance distribution corresponding to a distribution of a light energy entering the imaging element based on the plurality of image data;

determining a change of the imaging environment based on the light energy entering the imaging element;

updating a position of the first luminance range in the second luminance range in accordance with the change of the photographing environment; and converting the luminance distribution to a distribution of a tone value to be displayed on the display unit by relating a luminance value within the updated first luminance range to be corresponded to the tone value in the tone range of the display unit after the update.

* * * * *